United States Patent
Kirkeby et al.

(10) Patent No.: US 7,179,980 B2
(45) Date of Patent: Feb. 20, 2007

(54) AUTOMATIC EXTRACTION OF MUSICAL PORTIONS OF AN AUDIO STREAM

(75) Inventors: Ole Kirkeby, Espoo (FI); Jyri Huopaniemi, Espoo (FI); Timo Sorsa, Helsinki (FI)

(73) Assignee: Nokia Corporation, Espoo (FI)

( * ) Notice: Subject to any disclaimer, the term of this patent is extended or adjusted under 35 U.S.C. 154(b) by 459 days.

(21) Appl. No.: 10/733,257

(22) Filed: Dec. 12, 2003

(65) Prior Publication Data

US 2005/0126369 A1 Jun. 16, 2005

(51) Int. Cl.
*G06F 17/00* (2006.01)
(52) U.S. Cl. .......................................... 84/600; 700/94
(58) Field of Classification Search ................ 700/94; 84/600–602; 381/56; 704/278
See application file for complete search history.

(56) References Cited

U.S. PATENT DOCUMENTS

| | | | |
|---|---|---|---|
| 5,343,251 A * | 8/1994 | Nafeh | 348/571 |
| 5,739,451 A | 4/1998 | Winksy et al. | |
| 5,870,583 A | 2/1999 | Maeda | |
| 6,185,527 B1 | 2/2001 | Petkovic et al. | |
| 6,570,991 B1 | 5/2003 | Scheirer et al. | |
| 2002/0080286 A1 | 6/2002 | Dagtas et al. | |
| 2002/0120456 A1* | 8/2002 | Berg et al. | 704/278 |
| 2003/0101050 A1 | 5/2003 | Khalil et al. | |
| 2003/0163823 A1 | 8/2003 | Logan et al. | |
| 2003/0171936 A1* | 9/2003 | Sall et al. | 704/500 |
| 2004/0064209 A1* | 4/2004 | Zhang | 700/94 |
| 2004/0165730 A1* | 8/2004 | Crockett | 381/56 |
| 2006/0065102 A1* | 3/2006 | Xu | 84/600 |
| 2006/0085188 A1* | 4/2006 | Goodwin et al. | 704/245 |

FOREIGN PATENT DOCUMENTS

WO WO 02/069148 A1 9/2002

OTHER PUBLICATIONS

U.S. Appl. No. 10/417,230, filed Apr. 17, 2003, Pyhämmi et al.
Z. Liu and Q. Huang, "Detecting news reporting using audio/visual information", pp. 324-328, vol. 3, Proceedings of the 1999 International Conference on Image Processing (ICIP 99), Kobe, Japan, Oct. 24-28, 1999.
Lie Lu, Hong-Jiang Zhang, Hao Jiang, "Content analysis for audio classification and segmentation", pp. 504-516, IEEE Transactions on Speech and Audio Processing, vol. 10, Issue 7, Oct. 2002.
J. Saunders, "Real-time discrimination of broadcast speech/music", pp. 993-996, vol. 2, ICASSP-96, Proceedings of the 1996 IEEE International Conference on Acoustics, Speech, and Signal Processing, Atlanta, GA, USA, May 7-10, 1996.

(Continued)

*Primary Examiner*—Lincoln Donovan
*Assistant Examiner*—David S. Warren
(74) *Attorney, Agent, or Firm*—Banner & Witcoff, Ltd.

(57) ABSTRACT

Music and non-music portions in an audio stream are identified. The audio stream is digitized and segmented into frames. Selected frames are passed through a filter bank which includes filters having bandwidths approximately proportional to their center frequencies. The spectral flux for each selected frame is calculated and smoothed. Frames having a smoothed spectral flux below a threshold value are associated with music, and frames having a smoothed spectral flux above a threshold value are associated with non-music.

31 Claims, 18 Drawing Sheets

OTHER PUBLICATIONS

L. Tancerel, S. Ragot, V.T. Ruoppila, and R. Lefebvre, "Combined speech and audio coding by discrimination", pp. 154-156, Proceedings of the 2000 IEEE Workshop on Speech Coding, Delavan, WI, USA, Sep. 17-20, 2000.

G. Tzanetakis and P. Cook, "Multifeature audio segmentation for browsing and annotation", pp. 103-106, IEEE Workshop on Applications of Signal Processing to Audio and Acoustics, New Paltz, NY, USA, Oct. 17-20, 1999.

International Search Report and Written Opinion of PCT/IB04/04085 dated Jul. 18, 2006.

* cited by examiner

| Filter | $b_0$ | $b_1$ | $b_2$ | $a_1$ | $a_2$ |
|---|---|---|---|---|---|
| $IIR_1$ | 0.027783810039665 | 0.027783810039665 | 0.0 | -0.944432379206670 | 0.0 |
| $IIR_2$ | 0.071811756522997 | 0.0 | -0.071811756522997 | -1.795293179345960 | 0.856376486954060 |
| $IIR_3$ | 0.088994201148690 | 0.0 | -0.088994201148690 | -1.598303355451260 | 0.822011597702620 |
| $IIR_4$ | 0.149302957497580 | 0.0 | -0.149302957497580 | -1.132863565308870 | 0.701394085004840 |
| $IIR_5$ | 0.422433562729650 | -0.422433562729650 | 0.0 | 0.155132874540700 | 0.0 |

FIG. 5

AUTOMATIC EXTRACTION OF MUSICAL PORTIONS OF AN AUDIO STREAM

FIELD OF THE INVENTION

The present invention relates to recording musical portions of an audio transmission having both music and non-music components.

BACKGROUND OF THE INVENTION

Accompanying the expansion of computer and other electronic technology is a continued growth in the types and variety of available entertainment. Music is no exception. Listeners can now receive music from a multitude of sources, e.g., compact disks (CD) and other digital recording media, audio streaming via the internet, cable channels dedicated to audio programming, satellite radio, etc. Despite this plethora of music sources, however, conventional radio broadcasting (e.g., AM, FM, shortwave) continues to be an important source of music for many people.

Although radio broadcasting still offers many advantages over other sources of musical programming, it also has disadvantages. One longstanding problem relates to the inclusion of non-musical programming in a radio broadcast. In particular, most radio broadcasting (at least by stations which play music) is a mixture of music, speech (e.g., announcements, news broadcasts, advertisements, etc.) and "jingles" (short sound tracks with musical qualities, such as may be used in a commercial advertisement). Many users find the non-musical programming to be distracting and/or annoying.

One solution to this problem is to record broadcasts without the non-music portions. However, many persons do not have the time to manually perform this recording, i.e., to manually start recording a broadcast at the beginning of a song and then stop recording when the song ends. An automatic way of recording broadcast music is therefore desired. Unfortunately, the wide variety of music types (having a wide variety of sound qualities), as well as the unpredictable ways in which music and non-music are combined in broadcast programming, makes this a difficult task.

FIGS. 1A and 1B show examples of this problem. In some cases, as shown in FIG. 1A, one music track may fade out toward its end, be followed by non-music (announcement, advertisement, etc.), after which another music track fades in. FIG. 1B shows another common scenario. In particular, a disc jockey (DJ) may speak over a song before the song ends, the song may then fade out as another song fades in, and the DJ may speak over the beginning of the next song. The problem can be compounded in many other ways: background music may be added to DJ or other announcements; a DJ may speak in the middle of a track; jingles (which have musical sound qualities) are included in advertisements and other non-music programming; some music contains speech and unconventional sound effects; etc.

There have been various prior efforts to automatically classify an audio or video stream (i.e., to automatically discriminate between different types of content within the stream), including speech-music discrimination. Although there are similarities in the algorithms and methods employed in some of these prior efforts, minor differences in the methods can have very significant effects. In some cases, a very small and unapparent change in an algorithm can make the difference between success or failure in a particular application. Many of these prior efforts also employ very complex algorithms requiring substantial processing. In light of these and other challenges, there remains a need for different implementations of systems and methods for discriminating between music and non-music portions of an audio broadcast.

SUMMARY OF THE INVENTION

Embodiments of the invention provide a way of identifying music and non-music portions in an audio stream. In a first embodiment, the invention includes a method for selectively recording music portions of an audio stream. The method includes receiving an audio stream having music and non-music portions, segmenting the audio stream into successive frames, and passing the signal contained in each of a plurality of the frames through multiple filters having different frequency responses. A smoothed spectral flux is computed for at least a subset of the plurality of frames, and recording commences at the point of the audio stream corresponding to a start frame, the start frame being a frame of the plurality having a smoothed spectral flux value below a threshold value. Recording stops at the point of the audio stream corresponding to a stop frame, the stop frame being a frame of the plurality having a smoothed spectral flux value above the threshold value. In another embodiment, the invention includes a machine-readable medium having instructions for performing a steps similar to those of the first embodiment. In yet another embodiment, the invention includes a recording unit configured to perform steps similar to those of the first embodiment.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 5 is a table of coefficients for difference equations according to at least one embodiment of the invention.

DETAILED DESCRIPTION OF THE PREFERRED EMBODIMENTS

The present invention includes a system and method for automatically recording music portions of an audio stream having music and non-music components. In many applications, accurate classification is not required all of the time when discriminating between music and non-music. For example, listeners sometimes wish to record one or more songs (or other musical tracks) simply for the purpose of avoiding commercial advertisements, news, spoken announcements and other non-musical programming. A user may be less concerned with recording every song during a given period than with avoiding as much non-music as possible. In many cases, successful recognition of more than 50% of the musical tracks played during a given time interval is adequate. When a portion of an audio stream is misclassified, however, it is more preferable to mistake music for non-music. In other words, the user may prefer to miss recording of some music rather than record non-music.

Figure 1A:
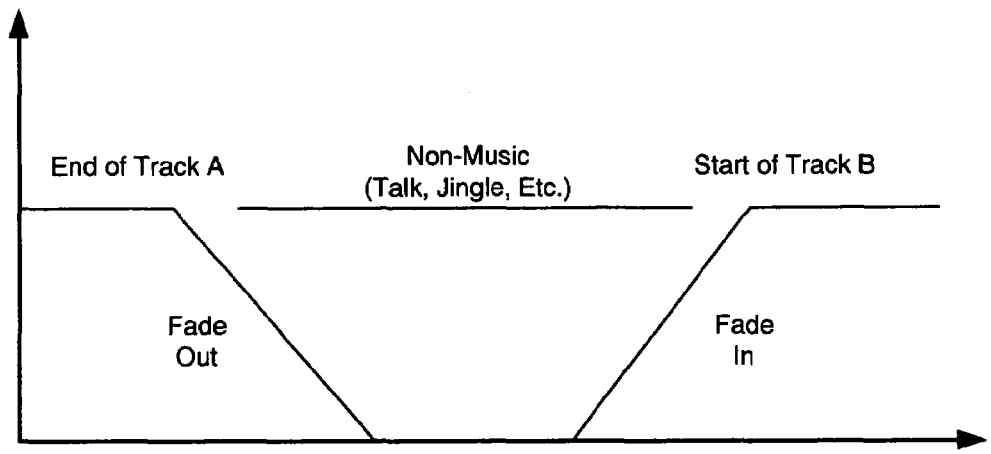
FIG. 1A is a graph showing an example of a combination of music and non-music programming.
Figure 1B:
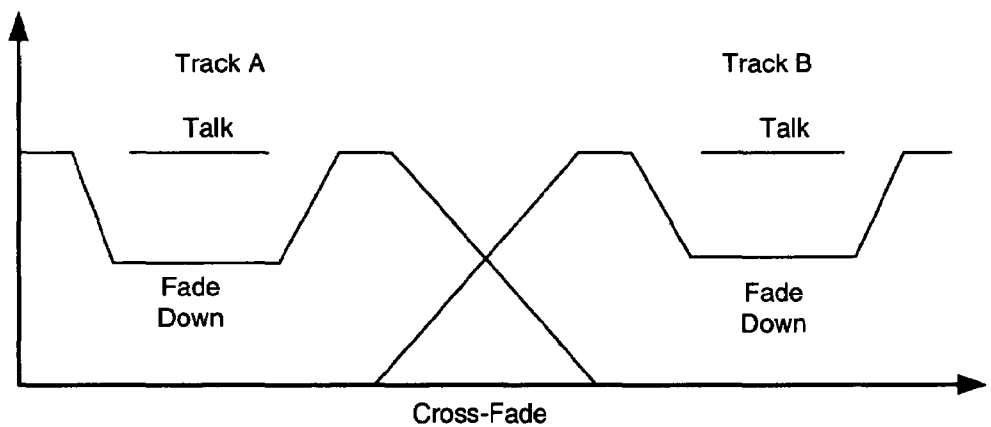
FIG. 1B is another graph showing an example of a combination of music and non-music programming.
Figure 2:
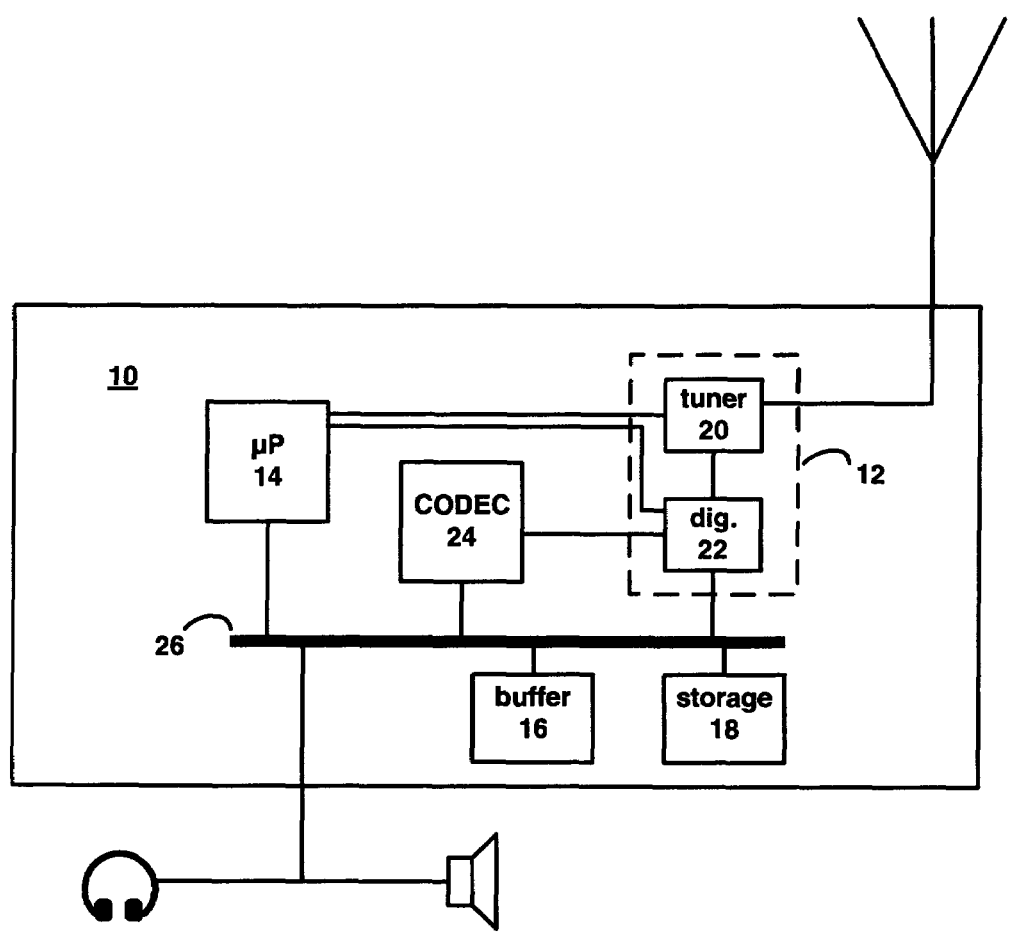
FIG. 2 is a block diagram of a recording device for automatically recording music portions of an audio broadcast according to at least one embodiment of the invention.

FIG. 2 is a diagram showing components of recording unit 10 according to one embodiment of the invention. Recording unit 10 includes an AM/FM receiver 12, a processor 14, a buffer (or temporary) memory 16 and a storage (or long-term) memory 18. In alternate embodiments, recording unit 10 could include a receiver of transmissions over television frequencies or other bands. Receiver 12, processor 14, memories 16 and 18 and other components are interconnected and communicate via one or more data buses 26. Receiver 12 further includes a tuner 20. Tuner 20, under direction from processor 14, tunes to a particular radio band and frequency, and provides an analog audio output to digitizer 22. Tuner 20 may also include filters, amplifiers and other components to enhance the quality of the received broadcast. Digitizer 22 converts the analog output from tuner 20 into digitized data by sampling the audio stream on the station which tuner 20 is configured to receive, and then converting that audio stream to digital values. The digitized audio is passed to processor 14 for further processing, as described below. In some embodiments, the digitized audio is also passed to CODEC 24. CODEC 24 converts the digitized audio to a particular format (e.g., MP3). Although CODEC 24 is shown in FIG. 2 as a separate component, the conversion of audio to MP3 or other format may be performed by CODEC software executed by processor 14. Processor 14 controls operation of digitizer 22, accesses buffer 16 and accesses storage memory 18. Processor 14 operates according to software instructions, which instructions may be stored on storage memory 18. Music from recording unit 10 (whether played back from memory or as received by tuner 20) may be played via headphones and/or speakers, and/or may be transferred to a another recording medium via an output port (not shown).

The converted digitized audio from CODEC 24 is stored in buffer 16 and/or storage memory 18. In other embodiments without a CODEC, uncompressed audio is stored. Buffer 16 is used to temporarily store recent broadcasts (or portions thereof). Upon receiving a "record" control signal from processor 14, the contents of an audio stream within buffer 16 are copied to memory 18 for long term storage. Upon receipt of a "stop record" control signal from processor 14, transfer of an audio stream from buffer 16 to memory 18 is stopped. Storage memory 18 can be a hard disk drive. Buffer 16 may be RAM or other volatile memory, may be a separately partitioned part of storage memory 18, or may be implemented in some other manner. The invention is not limited by the type of media in which buffer 16 or storage memory 18 are embodied. The particular architecture and arrangement of components shown in FIG. 2 is only one example of a recording unit in accordance with the invention. Additional components may be added, and the above components may be combined and/or perform additional functions.

Figure 3:
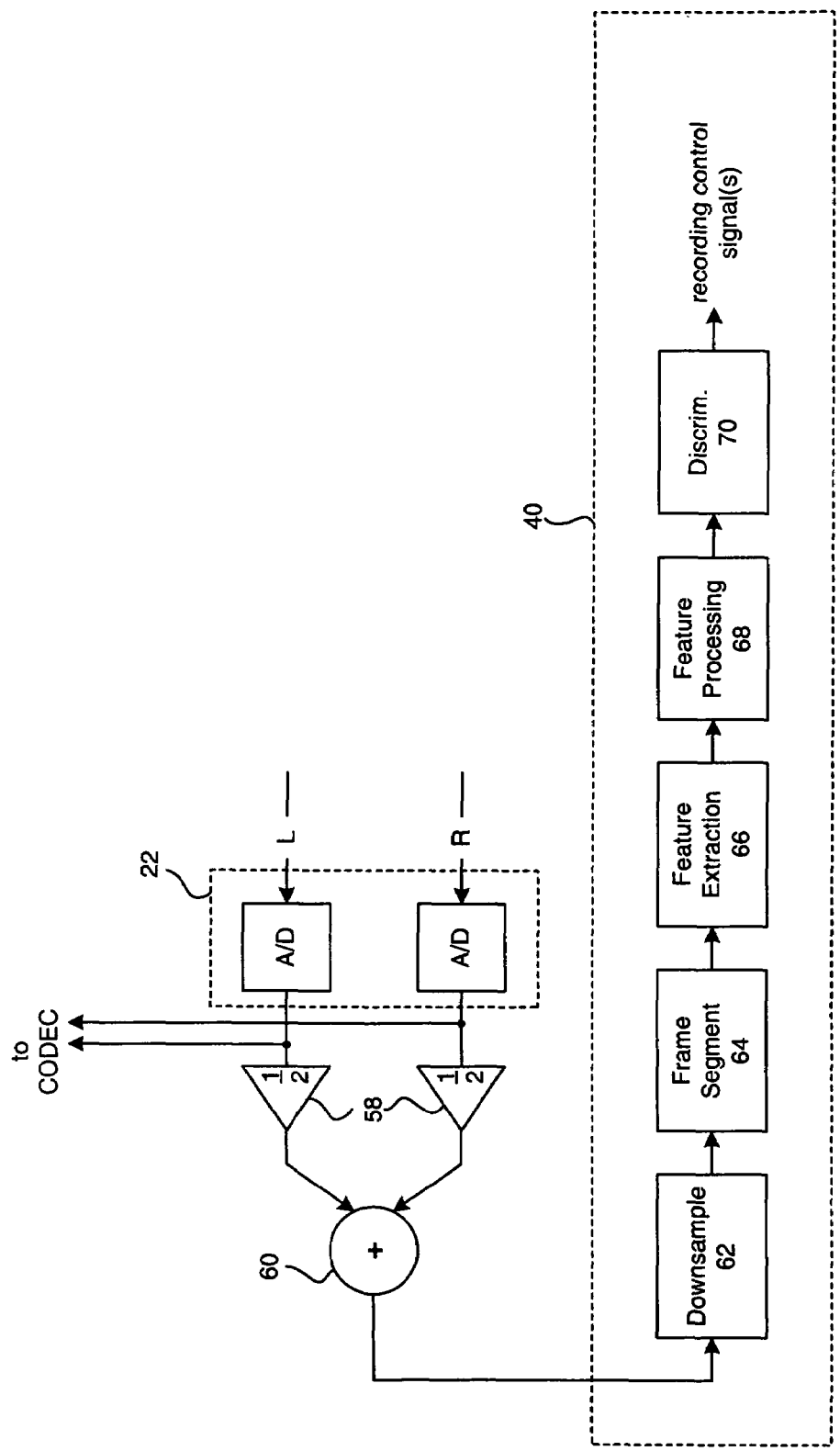
FIG. 3 is a diagram showing an audio signal classifier according to at least one embodiment of the invention.

FIG. 3 is a block diagram showing operation of an audio signal classifier 40 according to at least one embodiment of the invention. Although shown as separate functional blocks, the various components of signal classifier 40 represent functions and processing operations carried out by processor 14 according to instructions stored in memory 18.

Received by processor 14 are the digitized and summed left and right channels of a stereo audio broadcast. Although the invention is described using a stereo audio stream as an example, the invention may also be implemented with monaural audio broadcasts having a single channel, or with audio broadcasts having more than two channels. The left and right channel signals are first digitized by analog to digital converters (ADC) within digitizer 22 (FIG. 2). In other embodiments, the audio stream may be received as digital input, and initial A/D conversion not required. In other embodiments, the audio signal(s) may be received in digital form, but preprocessed so as to convert the stream to a different format prior to input into processor 14. In the example of FIG. 3, after digital conversion in ADCs of digitizer 22, the digitized left and right signals are split. One set of digitized left and right signals passes to amplifiers 58, where the amplitude of each signal is reduced by half. The other set of left and right signals passes of CODEC 26, and is then stored in buffer 16 (FIG. 2).

The output signals from amplifiers 58 are then combined in summer 60 and passed to downsampling block 62. Because the sampling frequency suitable for operation of classifier 40 is lower than that required for good audio quality, and because a lower sampling frequency facilitates faster processing, the signal is "downsampled" to a lower sampling frequency. In some embodiments, the signal is downsampled by a factor of four. In other words, if a received analog audio signal is sampled at 44.1 KHz by the ADCs of digitizer 22, the digital output from digitizer 22 is further sampled such that the resulting signal is effectively an 11.025 KHz sample of the original analog input. Although processing benefits are obtainable if the audio signal is downsampled, downsampling is not performed in some embodiments.

The output signal from downsampling block 62 is then segmented into shorter frames in block 64. In one embodiment, the downsampled signal is cut into frames representing portions of the audio input approximately 100 milliseconds in length. In this embodiment, the frames do not overlap (i.e., the portion of the audio stream corresponding to the end of frame k is not prior to the portion of the audio stream corresponding to the beginning of succeeding frame k+1) and are not weighted. Instead, the signal is simply "chopped" into 100 millisecond blocks. Each 100 millisecond block contains N digitized samples of the combined original audio stream, where N=downsampled frequency (KHz)×frame size (milliseconds). For example, for an 8 KHz downsampled rate and a 100 ms frame size, N=8×100=800. In some embodiments, the frame size is adjusted, based on the downsampled rate, to provide a convenient number of samples per frame. For example, if the analog audio stream is initially digitized at a 44.1 KHz sampling rate and then downsampled to 11.025 KHz, the frame size would be adjusted to approximately 93 milliseconds to provide a N value of 1024.

Figure 4:
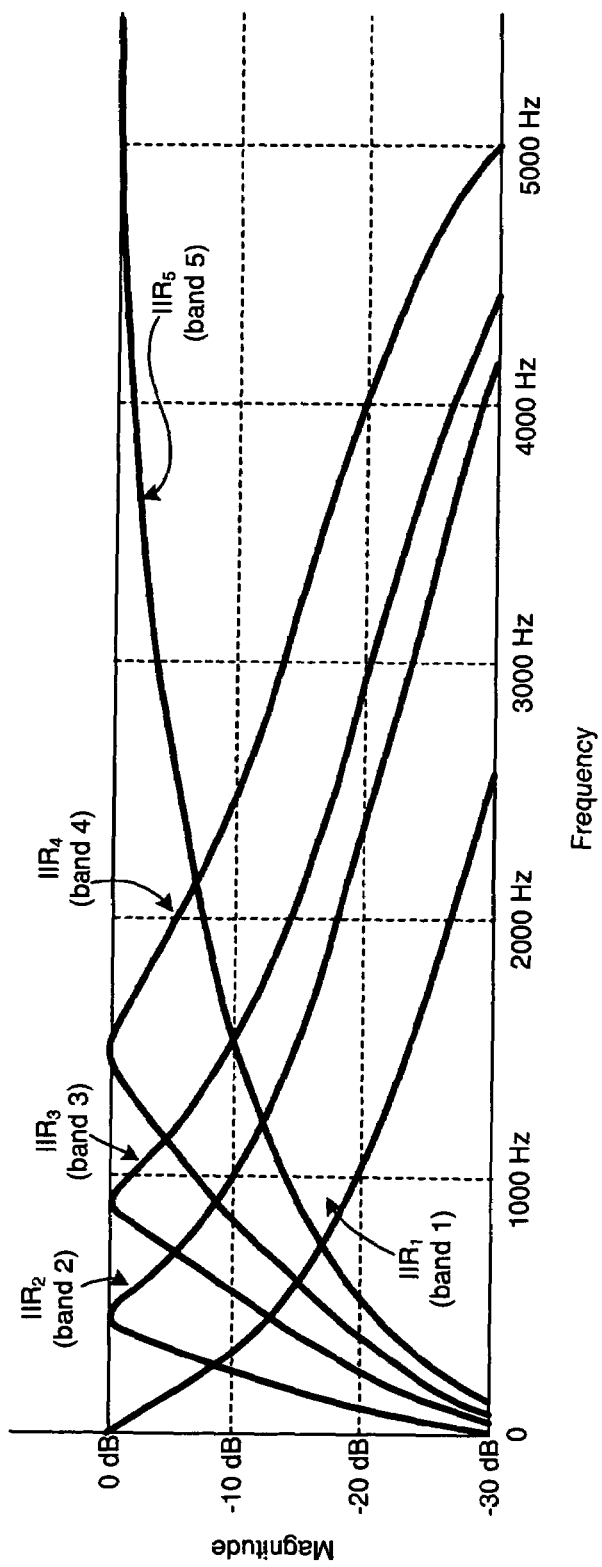
FIG. 4 is a graph of frequency responses for a series of filters according to at least one embodiment of the invention.

Each frame is then processed by feature extraction block 66. Within block 66, each frame is first passed in parallel through a filter bank which includes filters having bandwidths approximately proportional to their center frequencies. In one embodiment, the filter bank contains five Infinite Impulse Response (IIR) filters. In at least one embodiment, each of these filters corresponds to a different band of possible audio frequencies within a frame, and has an amplitude response as shown in FIG. 4. In particular, first filter $IIR_1$ corresponds to band 1 and is a low pass filter. Samples within a frame having very low frequencies are passed at near full amplitude, and the amplitude of higher frequency samples is attenuated (by approximately −20 dB at 1000 Hz and by approximately −30 dB at 2500 Hz). Second filter $IIR_2$ corresponds to band 2. Samples having a frequency of approximately 450 Hz pass through with almost no attenuation, while samples at frequencies lower than about 250 Hz and higher than about 1000 Hz are attenuated by −10 dB. Third filter $IIR_3$ corresponds to band 3 and allows samples at frequencies of about 900 Hz to pass with little attenuation. Samples at frequencies of about 500 Hz and 1500 Hz are attenuated by −10 dB. Fourth filter $IIR_4$ corresponds to band 4 and passes samples with frequencies of about 1500 with little attenuation. Filter $IIR_4$ attenuates by about −10 dB samples at frequencies of 800 Hz and 2500 Hz. Finally, fifth filter $IIR_5$ corresponds to band 5 and allows samples at frequencies above approximately 5000 Hz to pass with little attenuation.

The samples in a frame are first passed through filters $IIR_1$ through $IIR_5$, each of which has a transfer function whose z-transform is of the type given by Equation 1.

$$H(z) = \frac{b_0 + b_1 z^{-1} + b_2 z^{-2}}{1 + a_1 z^{-1} + a_2 z^{-2}} \qquad \text{Equation 1}$$

The output from a filter of this type can be calculated by using the second order difference equation given by Equation 2.

$$y_i(n) = b_0 x_i(n) + b_1 x_i(n-1) + b_2 x_i(n-2) - a_1 y_i(n-1) - a_2 y_i(n-2) \qquad \text{Equation 2}$$

In Equation 2, $x_i(n)$ is the digitized value for the nth sample of a frame, and $y_i(n)$ is the output from the ith IIR which is initialized with zeros so that $x(-1)=x(-2)=y(-1)=y(-2)=0$. In other embodiments, the IIR filters are not initialized with zeros and are allowed to "run over" frame boundaries and use past inputs and outputs. The coefficients for Equation 2 for a downsampled rate of 11.025 KHz, under at least one embodiment, are provided for filters $IIR_1$ through $IIR_5$ in FIG. 5. For first order filters (e.g., a low pass filter such as $IIR_1$ or a high pass filter such as $IIR_5$), $b_2$ and $a_2$ are zero.

As given in Equation 3, an example of a RMS energy estimate $E_i$ for a frame passing through filter $IIR_i$ is the sum of the absolute values of $y_i(n)$ for each sample n in a frame.

$$E_i = \sum_{n=0}^{N-1} |y_i(n)| \qquad \text{Equation 3}$$

As given in Equation 4, a feature $e_i$ is calculated for each frame based on the logarithm of the RMS energy estimate $E_i$.

$$e_i = \log 10\left(\frac{E_i + C}{C}\right) = \log 10(E_i + C) - \log 10(C) \qquad \text{Equation 4}$$

The offset C is included to avoid large variations in $e_i$ for quiet frames. The offset ensures that the RMS estimate of a silent frame is zero. For 16-bit audio $|x(n)|<32768$, and C is thus set to 100,000 in at least one embodiment.

After calculation of the features $e_1$, $e_2$, $e_3$, $e_4$ and $e_5$ in feature extraction block 66 (FIG. 3), the feat The spectral flux SF, which is a measure of how much $e_i$ changes between consecutive frames k and k−1, is based on Equation 5.

$$SF = \sum_{i=1}^{5} |e_i(k) - e_i(k-1)| \qquad \text{Equation 5}$$

The spectral flux SF is generally higher for simple and slowly varying signals such as speech, and is generally lower for chaotic broadband signals such as music. However, the spectral flux SF often varies too quickly to be useful without smoothing. Accordingly, in at least one embodiment, SF is averaged over a number (K) of previous frames, as shown in Equation 6.

$$\langle SF_K \rangle = \frac{1}{K} \sum_{k=0}^{K-1} SF_{-k} \qquad \text{Equation 6}$$

Figure 6A:
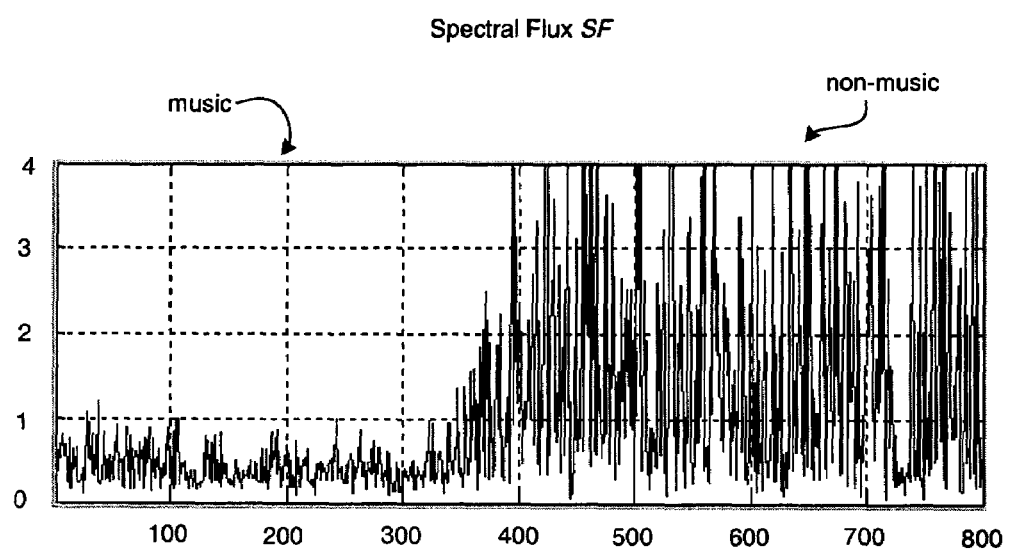
FIGS. 6A and 6B are graphs showing the effect of smoothing on spectral flux.
Figure 6B:
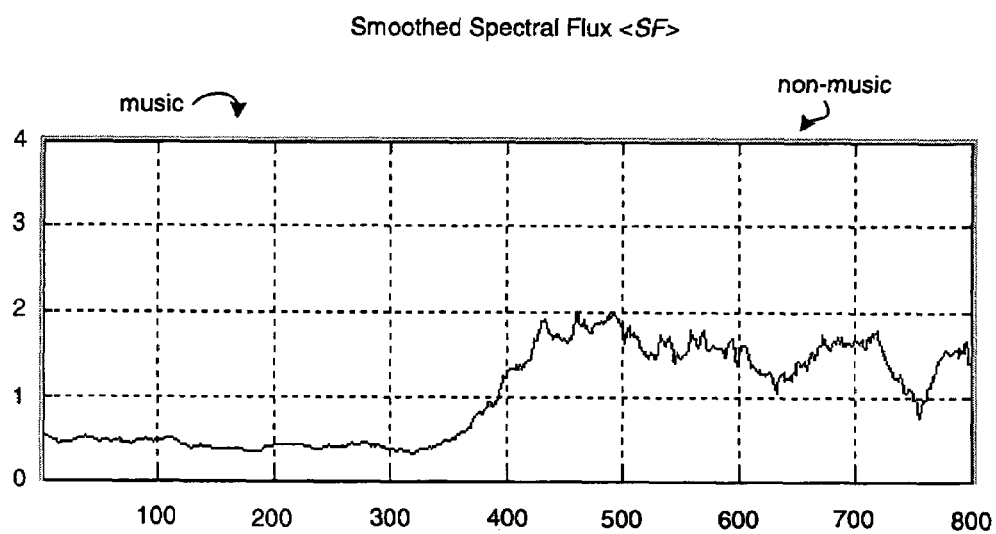

In at least one embodiment, K=40, and corresponds to approximately 4 seconds of audio. FIGS. 6A and 6B show the effect of smoothing in a favorable case that clearly indicates a transition from music to speech. Smoothing can introduce a significant processing delay. Because SF generally varies slowly, however, it is not necessary to calculate SF for every frame. In some embodiments, SF is calculated two or three times per second. This is equivalent to further downsampling the frame rate. For a frame length of 93 milliseconds, this is roughly equivalent to further downsampling by a factor of four.

Figure 7:
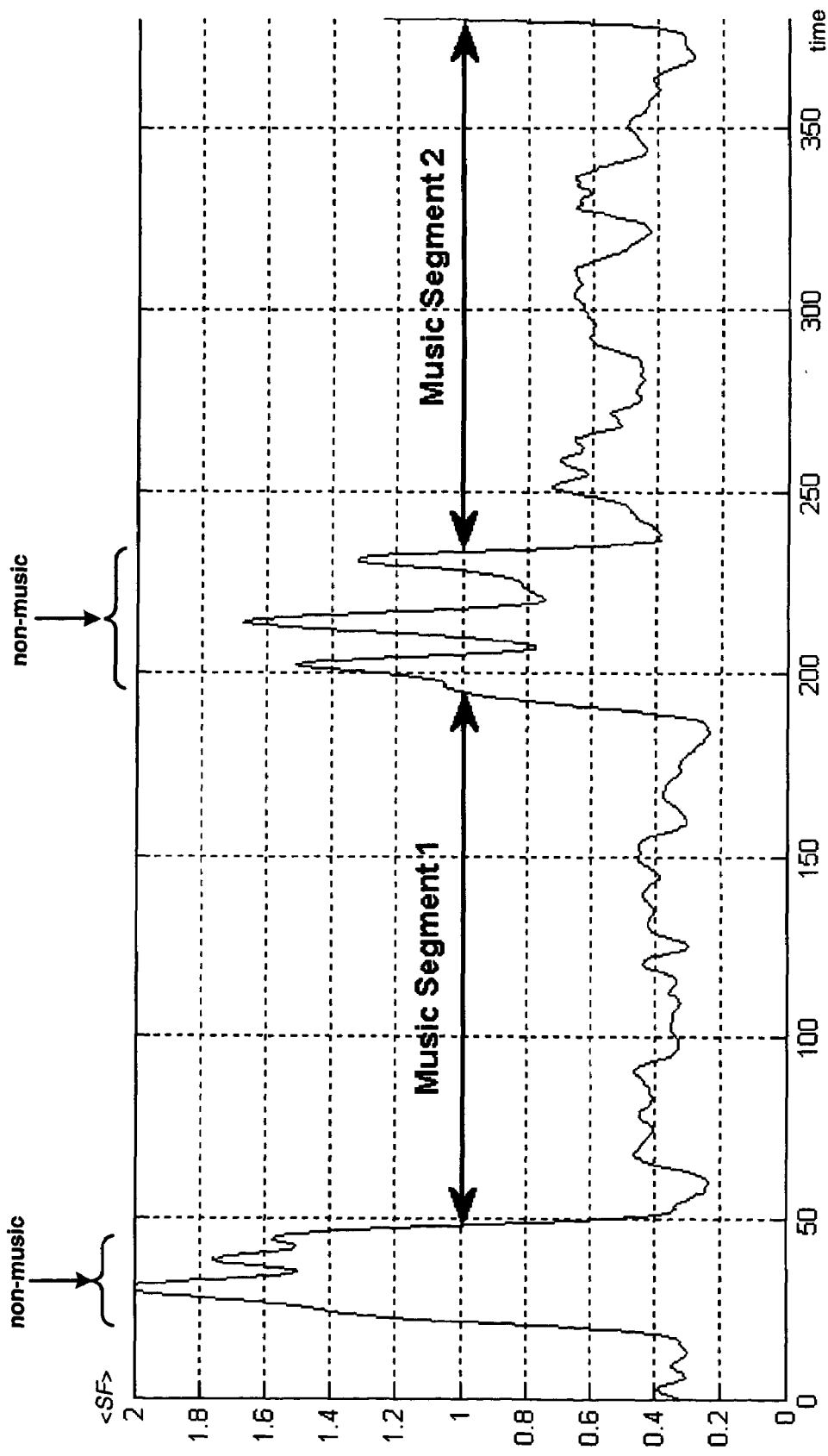
FIG. 7 is a graph showing an example of smoothed spectral flux for two music tracks with interspersed non-music.

Using values for smoothed spectral flux (<SF>) calculated by feature processing block 68, discrimination block 70 determines whether an audio stream currently contains music or non-music. Based on this determination, discrimination block 70 issues control signals that cause buffered portions of an audio broadcast to be stored in memory 18. Because low values for <SF> suggest music, discrimination block 70 searches for long sections of audio (i.e., multiple frames) during which <SF> does not exceed a decision threshold $<SF>_{MAX}$. In one embodiment, $<SF>_{MAX}$ is set to 1.0. FIG. 7 shows examples in a clear-cut case for values of <SF> for two music tracks with interspersed non-music.

Figure 8A:
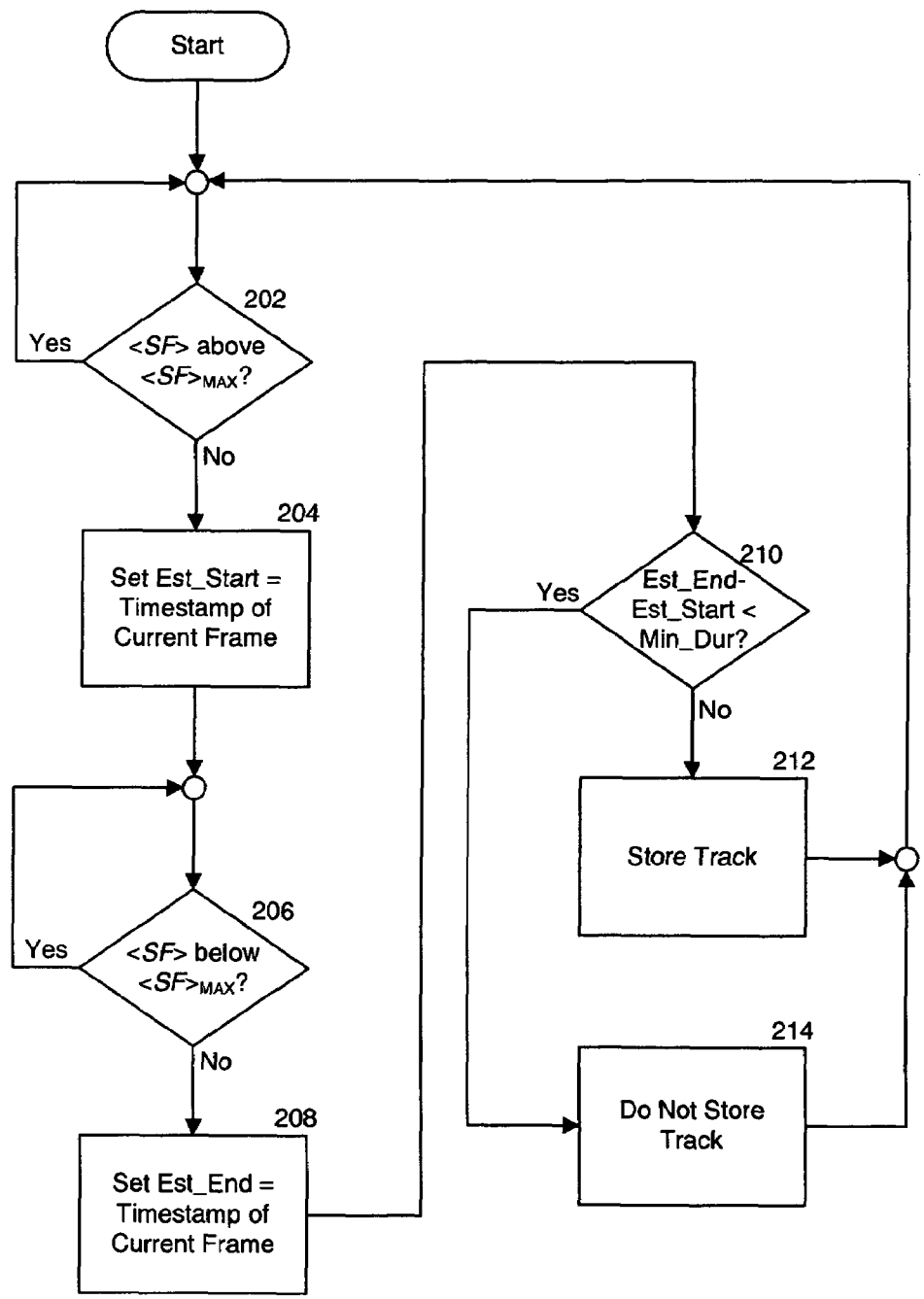
FIGS. 8A–10B are flow charts showing operation of a classifier according to various embodiments of the invention.

FIG. 8A is flow chart showing one embodiment of a detection algorithm for cases such as that shown in FIG. 7. After instantiation of classifier 40, processor 14 first determines whether <SF> is above <SF>$_{MAX}$ (step 202). If yes, and as shown by the loop back to the step 202 input, processor 14 continues to wait until <SF> is below <SF>$_{MAX}$. If <SF> is not above <SF>$_{MAX}$ in step 202, and as shown in step 204, processor 14 sets a variable ("Est_Start") equal to the timestamp of the frame for which <SF> dropped below <SF>$_{MAX}$. At step 206, processor 14 determines whether <SF> is still below <SF>$_{MAX}$. If yes, and as shown by the loop back to the step 206 input, processor 14 continues to wait until <SF> is no longer below <SF>$_{MAX}$. Once <SF> rises above <SF>$_{MAX}$, (i.e., the no output of step 206), another variable ("Est_End") is set at step 208 to the timestamp of the frame for which <SF> rose above <SF>$_{MAX}$.

At step 210, processor 14 determines whether <SF> remained below <SF>$_{MAX}$ for minimum amount of time (Min_Dur). In this manner, processor 14 is able to exclude many commercial advertisements containing jingles and other types of programs which may contain musical sound qualities, but which a user does not wish to record.

If Est_End-Est_Start is less than Min_Dur, a decision is made at step 214 not to store the track in memory 18. The corresponding portion of buffer 16 is freed for use to store subsequent audio data, and processor 14 returns to step 202 to resume waiting for <FS> fall below <SF>$_{MAX}$. If, however, Est_End-Est_Start is greater than or equal to Min_Dur, processor 14 decides at step 212 to store the track in memory 18. The track is copied from buffer 16 into memory 18, the corresponding portion of buffer 16 freed for use to store subsequent audio data, and processor 14 returns to step 202 to resume waiting for <SF> fall below <SF>$_{MAX}$. In one embodiment, Min _Dur is set to approximately 60 seconds. In other embodiments, Min_Dur is set to approximately 120 seconds.

Figure 9A:
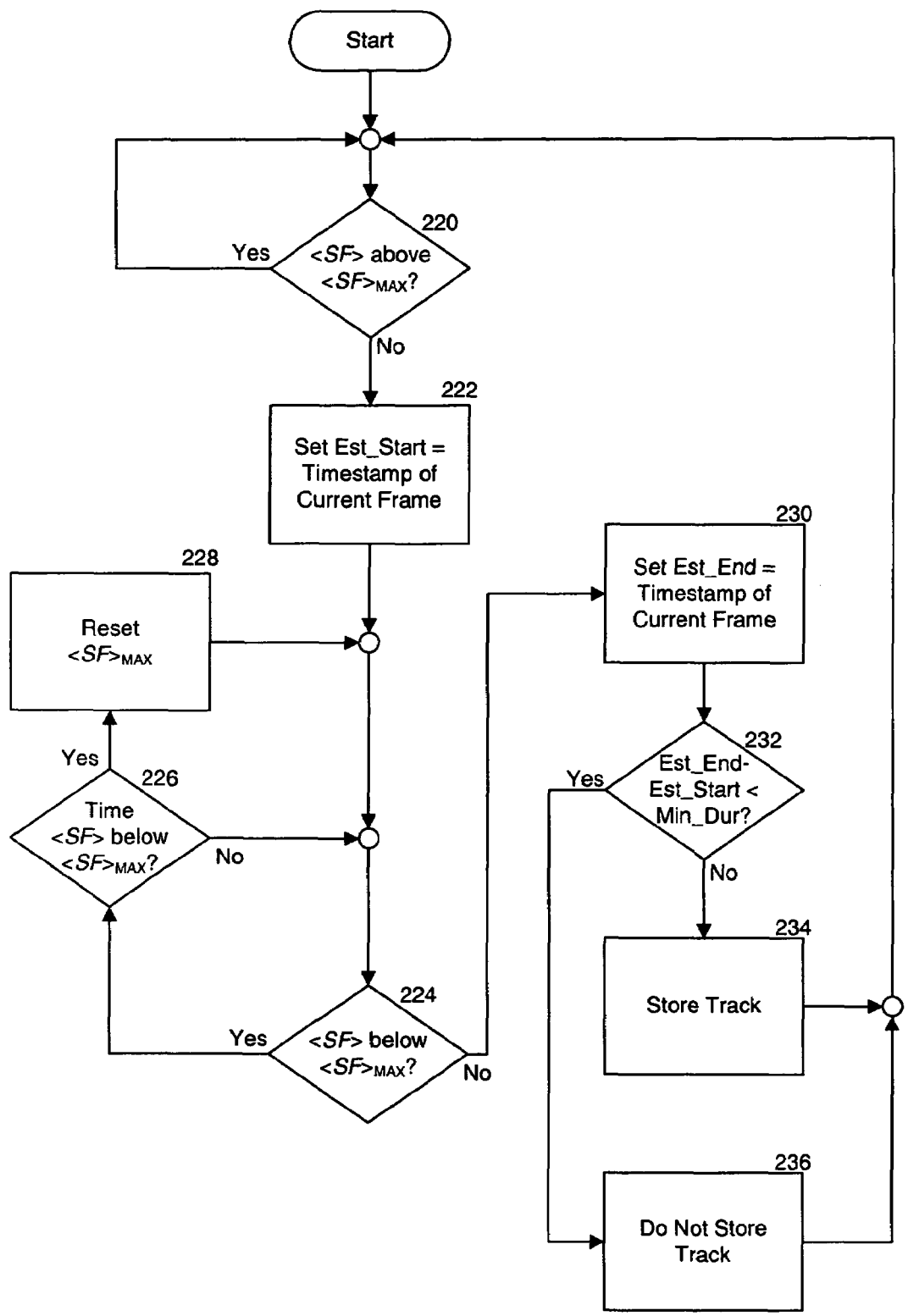

In still other embodiments, Min_Dur is adjustable by the user and/or automatically by processor 14. For example, some music tracks may contain brief portions which resemble ordinary speech. In such a case, <SF> may briefly rise above a preset value for <SF>$_{MAX}$, causing the track to be undesirably divided. As one solution, and as shown in FIG. 9A, <SF>$_{MAX}$ is adjusted as a function of time. Blocks 220, 222, 224, 230, 232, 234 and 236 of FIG. 9A are respectively similar to blocks 202, 204, 206, 208, 210, 212 and 214 of FIG. 8A.

FIG. 9A includes additional steps 226 and 228. At step 224, after determining that <SF> is still below <SF>$_{MAX}$, processor 14 determines at step 226 how long the <SF> has been below <SF>$_{MAX}$. If the time exceeds a predetermined value (the "yes" output of step 226), <SF>$_{MAX}$ is revised at step 228. For example, if <SF> has been below <SF>$_{MAX}$ for longer than one minute, <SF>$_{MAX}$ is increased from 1.0 to 1.2 at step 228, and processor 14 returns to step 224. If the time does not exceed a predetermined value at step 226 (the "no" output), <SF>$_{MAX}$ remains the same and processor 14 returns to step 224. In at least one embodiment, the logic of steps 226 and 228 is implemented as a lookup table. If the amount of time that <SF> is below <SF>$_{MAX}$ exceeds a predetermined value (the "yes" output of step 226), <SF>$_{MAX}$ is increased or decreased by different amounts after different amounts of time. For example, after the first minute of <SF> being below <SF>$_{MAX}$, <SF>$_{MAX}$ is increased from 1.0 to 1.2. After four minutes of <SF> being below <SF>$_{MAX}$, <SF>$_{MAX}$ is reduced from 1.2 to 0.8. This particular implementation will cause fewer short songs to be interrupted, but will cause longer songs to be split up.

In some circumstances, the user may not wish for a particular recorded track to exceed a preset length. For example, a broadcast may play several songs in succession with no intervening announcements or other non-music portions, and the user may only wish to record short music tracks. In this situation, <SF> could remain below <SF>$_{MAX}$ for an extended period of time (e.g., 10 minutes or more). In other embodiments, processor 14 is therefore configured to stop recording when <SF> has remained below <SF>$_{MAX}$ beyond a preset time (Max_Dur).

Figure 10A:
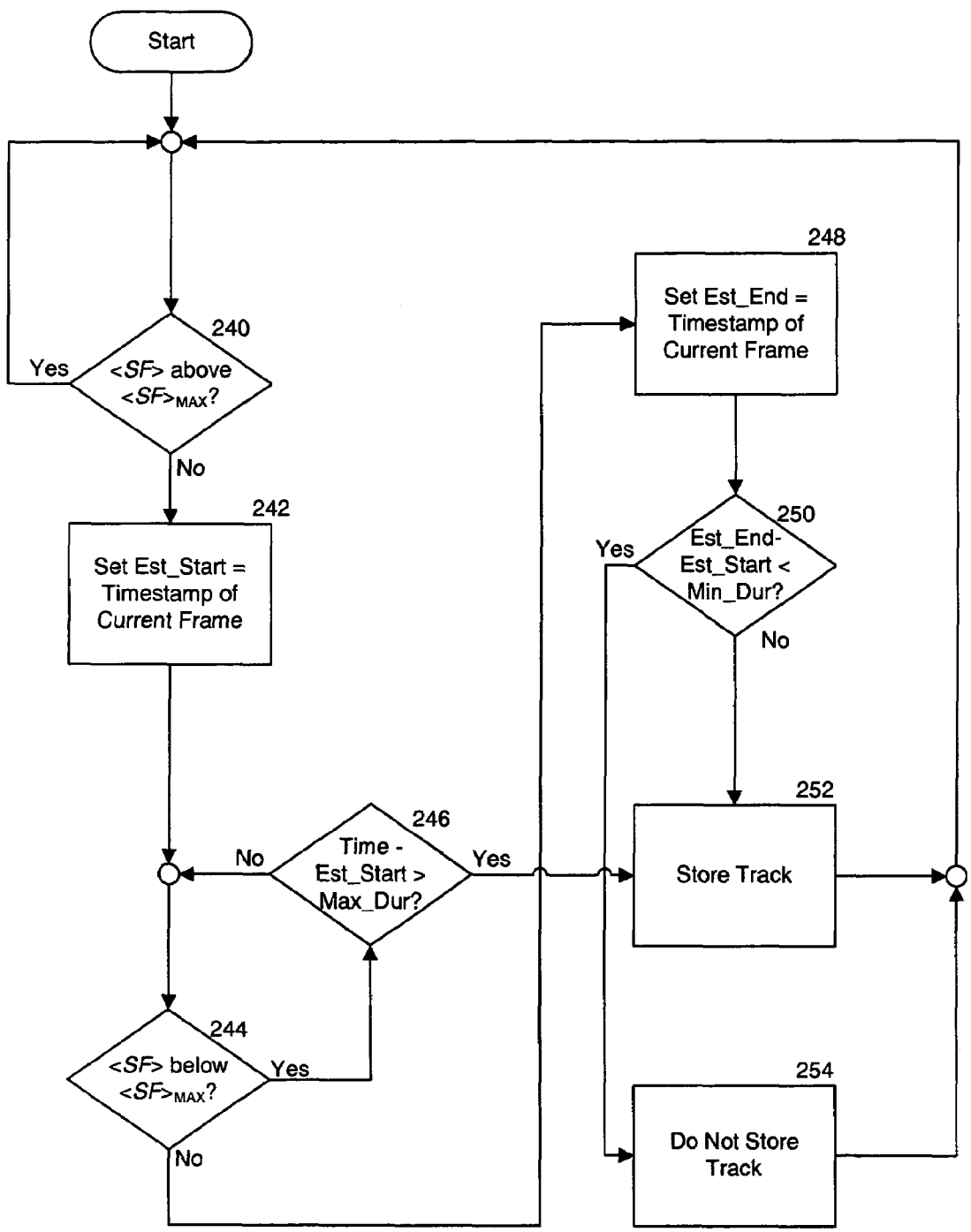

One algorithm for this embodiment is shown in FIG. 10A. Steps 240, 242, 244, 248, 250, 252 and 254 of FIG. 10A are respectively similar to steps 202, 204, 206, 208, 210, 212 and 214 of FIG. 8A. However, at step 246 of FIG. 10A, processor 14 determines whether <SF> has remained below <SF>$_{MAX}$ longer than Max_Dur. If so (the "yes" output of step 246), processor 14 proceeds directly to step 252. The track that has played since <SF> went below <SF>$_{MAX}$ is stored in memory 18, and processor 14 returns to step 240. Because <SF> will still be below <SF>$_{MAX}$ (assuming several songs are playing in succession), Est_Start will be reset to the timestamp of the currently playing frame, and the currently playing track will continue to be recorded as a separate music track (assuming the current track continues beyond Min_Dur ). In other embodiments, a "second best" interruption point is used when <SF> has remained below <SF>$_{MAX}$ longer than Max_Dur. For example, once <SF> has remained below <SF>$_{MAX}$ for, e.g., 80% of Max_Dur, the current track is analyzed to determine if there have been any relatively large increases or decreases in <SF> since the song began. For example, once <SF> falls below a percentage of the average <SF> since the song began (or rises above a percentage of the average <SF> since the song began), processor 14 stops recording the track and begins recording a new track.

Figure 8B:
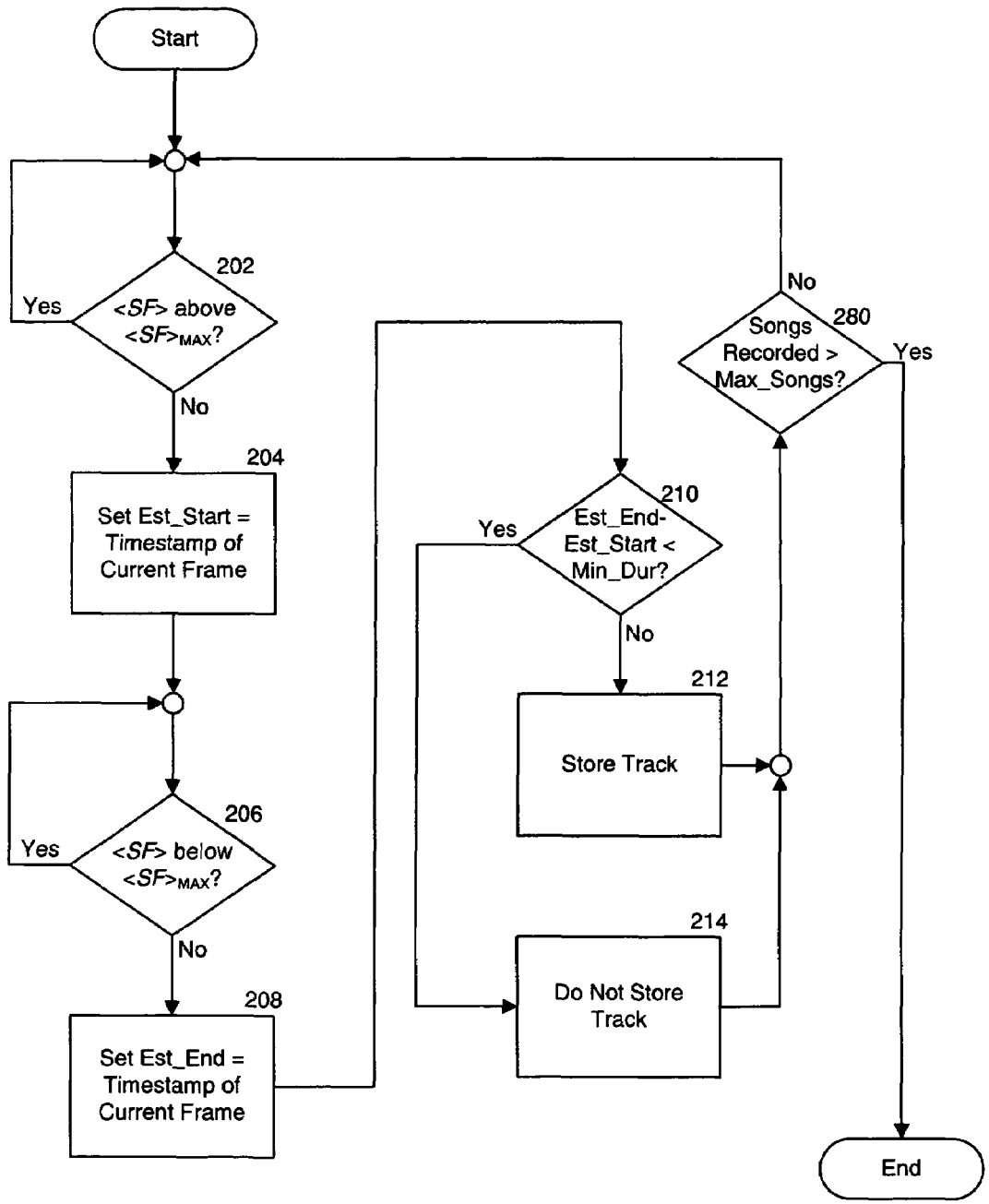
Figure 9B:
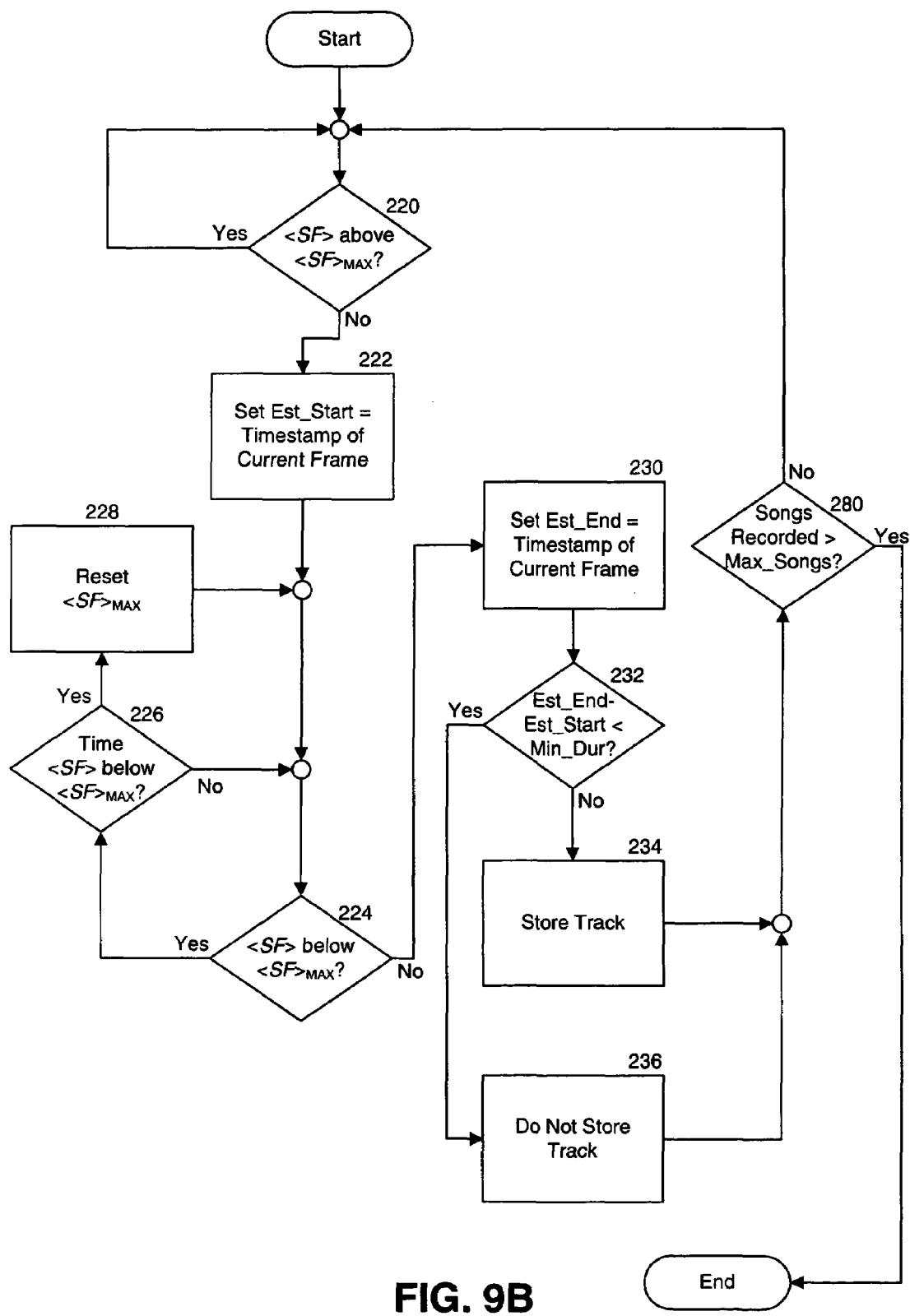
Figure 10B:
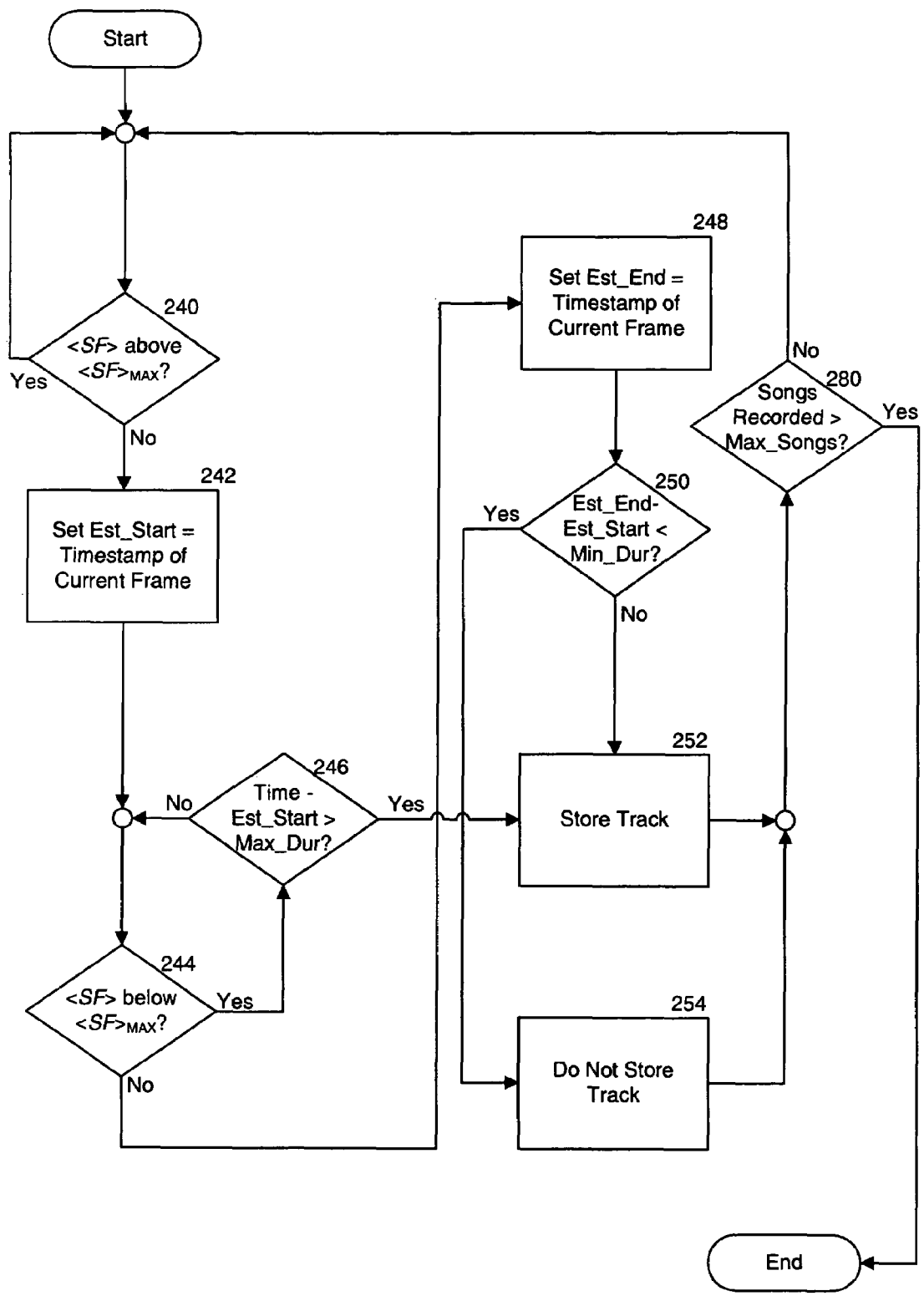

The flow charts of FIGS. 8A, 9A and 10A represent algorithms where processor 14 continues to search for and record additional songs after the end of a song is detected. In other embodiments, the algorithms are modified to stop searching after a certain number of songs have been recorded. FIGS. 8B, 9B and 10B is each an example of how the algorithm of FIGS. 8A, 9A and 10A, respectively, has been modified in this manner. A new step 280 is added in each of FIGS. 8B, 9B and 10B. If in step 280 processor 14 detects that the total number of songs recorded exceeds the maximum number allowed or desired ("Max_Songs"), the algorithm ends. Max_Songs can be set to 1, 2, 3 or any other value.

In other applications, a user may wish to record a specific song as he or she hears the song being broadcast. However, the user may not realize that he or she wishes to record the song until after it has begun. In such case, embodiments of the invention automatically "look back" at a portion of just-broadcast audio and find the beginning of the current song. Alternatively (or additionally), the conclusion of a musical track can be automatically identified, and the user need not wait until the conclusion of the track to manually stop recording. In still other cases, a user may wish to remotely record a particular song. For example, a user may be listening to music on a mobile terminal equipped with an AM/FM receiver. However, the terminal may lack memory or other resources required for recording substantial amounts of music. In at least one embodiment of the invention, a user hearing music via a mobile terminal is able to record that music at a remote location.

Figure 11:
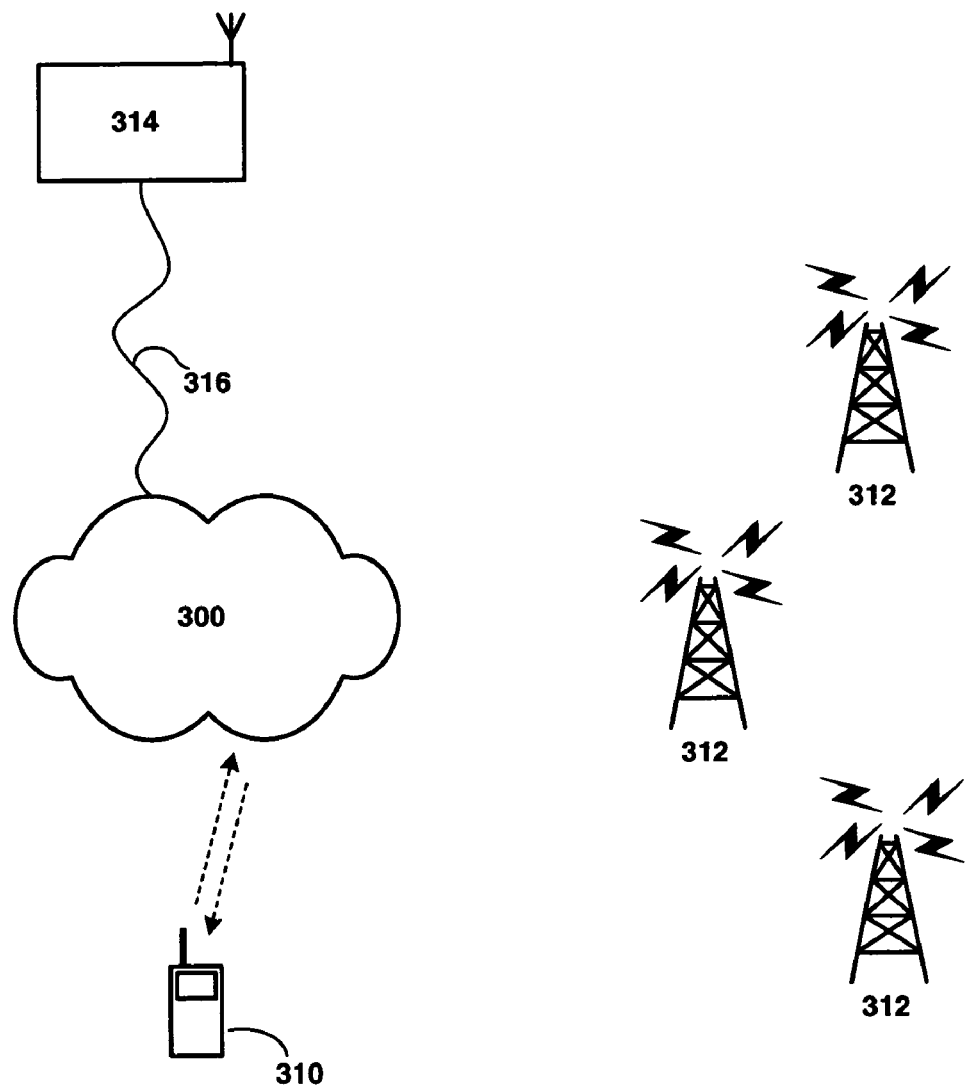
FIG. 11 is a diagram of an architecture for remotely recording audio broadcasts according to at least one embodiment of the invention.

FIG. 11 is a diagram of an architecture for a system for remotely recording audio broadcasts according to additional embodiments of the invention. Although the invention is described by an example of a system for recording audio broadcasts from an AM or FM radio station, the invention is also applicable to broadcasts that could include video or other components. Mobile terminal 310 communicates via wireless network 300. Wireless network 300 is represented schematically as a cloud, but includes base stations that transmit and receive wireless communications, and may include switching equipment, connections to other networks, and other components. Because these aspects are known in the art, further description is not needed herein. In addition to providing wireless two-way communication, mobile terminal 310 also receives broadcast radio programming from one or more broadcast stations 312. Mobile terminal 310 selects a broadcast station by tuning to the assigned broadcast frequency for that station.

Also shown in FIG. 11 is a recording unit 314. Recording unit 314 might typically be located in a home, office or other relatively permanent location, although recording unit 314 could also be portable. Recording unit 314 receives communications from mobile terminal 310 via wireless network 300. Recording unit 314 may be directly connected to wireless network 300, but in a preferred embodiment will communicate with wireless network 300 via one or more intermediate networks. Such intermediate networks could include, e.g., wired telephone service and/or the Internet. In some embodiments, recording unit 314 also transmits communications to mobile terminal 310 via wireless network 300 and one or more intermediate networks. Recording unit 314 also receives broadcast programming from broadcast stations 312. In one embodiment, recording unit 314 receives communications from broadcast stations 312 by RF transmission to an antenna on recording unit 314, but in other embodiments may receive such broadcasts via a cable or other wired connection. Network connection 316 may be a conventional telephone connection, an Internet connection, or other communication network connection.

Figure 12:
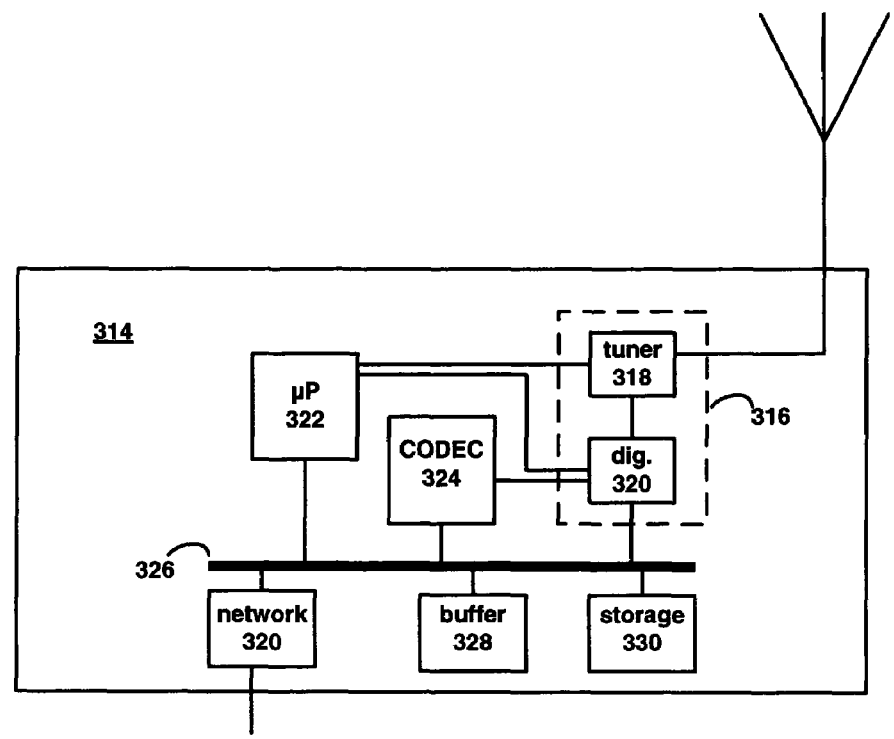
FIG. 12 is a block diagram of a recording device for automatically recording music portions of an audio broadcast according to at least one embodiment of the invention.

FIG. 12 is a diagram showing components of recording unit 314 according to one embodiment of the invention. Recording unit 314 is similar to recording unit 10 (FIG. 2), and includes an AM/FM receiver 316 (having tuner 318 and digitizer 320), a processor 322, CODEC 324, buffer memory 328, storage memory 330, and bus 326. Recording unit 314 further includes a network interface 320. Network interface 320 allows recording unit 314 to receive communications from, and optionally transmit communications to, mobile terminal 310. Network interface 320 may be a modem, a network interface card, or other network access device. The particular architecture and arrangement of components shown in FIG. 12 is only one example of a recording unit in accordance with the invention. Additional components may be added, and the above components may be combined and/or perform additional functions.

Figure 13:
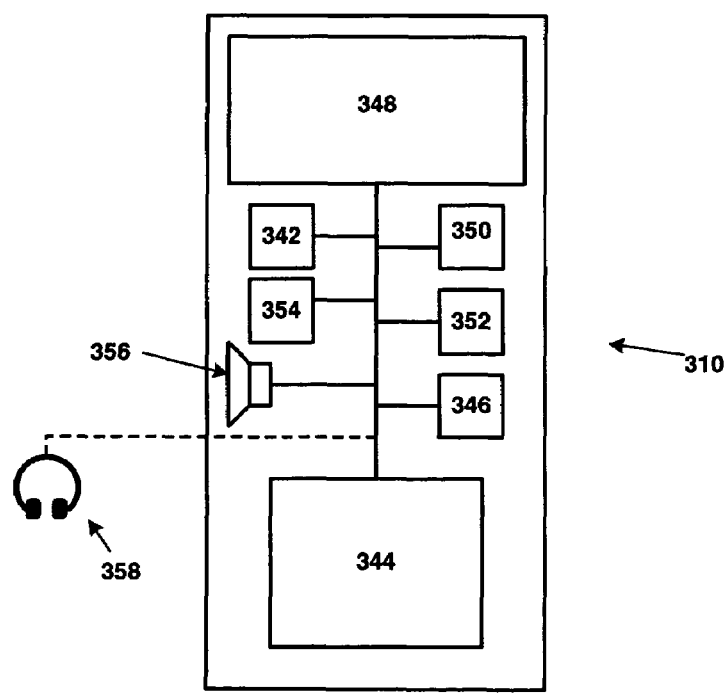
FIG. 13 is a block diagram for a mobile terminal according to at least one embodiment of the invention.

FIG. 13 is a block diagram of a mobile terminal 310 according to one embodiment of the invention. As used herein, "mobile terminal" includes cellular and other wireless telephones, mobile devices communicating by General Packet Radio Service to send and receive data, devices permitting wireless Internet telephony, and any other mobile communication device that facilitates wireless two-way communication between a user of the device and another location. Mobile terminal 310 includes a communications interface 342, inputs (e.g., keypad 344 and audio/visual inputs 346), display 348, memory 350, processor 352 and broadcast receiver 354. Communications interface 342 includes components needed to transmit and receive information (whether voice, data or other information) via wireless network 300. Audio/visual inputs 346 may include, e.g., a microphone and/or a camera.

A user of the mobile terminal 310 provides input via keypad 344 to access features of mobile terminal 310. Operation of mobile terminal 310 is controlled by a processor 352, which receives instructions and data from, and stores data to, memory 350. Mobile terminal 310 further includes a broadcast receiver 354. Broadcast receiver 354 tunes to a frequency of a desired broadcast station, and provides audio output via a speaker 356 or headset 358. In other embodiments, broadcast receiver 354 could also provide video or other types of output via, e.g., display 348. The mobile terminal shown in FIG. 13 is only one example of a possible mobile terminal in accordance with the invention.

The system shown in FIG. 11 allows a user of mobile terminal 310 to store AM, FM or other broadcast programming transmissions while listening to that programming on mobile terminal 310. Although the user might be listening to the broadcast on mobile terminal 310, the broadcast is recorded by recording unit 314, which can be remotely located from mobile terminal 310. The user can, while receiving a broadcast transmission via mobile terminal 310, send a notification to the recording unit 314 via wireless network 300. The notification instructs the recording unit to store the current broadcast transmission of a designated broadcast frequency. The broadcasted transmission is stored at recording unit 314, and can be replayed later or transferred to storage on another device. For example, the recording could be transferred over a BLUETOOTH link (as described in, e.g., "Specification of the Bluetooth System," version 1.1, dated Feb. 22, 2001, available from Bluetooth SIG, Inc. at <http://www.bluetooth.com>) to an MP3 player or other device.

Upon activation of the broadcast receiver 354 of mobile terminal 310, a signal may be sent via wireless network 300 to recording unit 314. That signal informs recording unit 314 that mobile terminal 310 has tuned to a particular broadcast frequency. Recording unit processor 322 then causes recording unit tuner 318 to tune to the same frequency. In one preferred embodiment, mobile processor 342 automatically sends a signal to recording unit 314 upon a user tuning the broadcast receiver 354 to a particular station. For example, mobile processor 352 could, upon the broadcast receiver 354 being tuned to a particular station for a certain time period (e.g., 10 seconds), determine that the user has elected to listen to that station. Mobile processor 352 could then transmit a signal on wireless network 300 containing the identity of recording unit 314 and the identity of the tuned frequency. When the user tunes to a different frequency, a subsequent signal can be transmitted containing the new frequency. Upon receipt of that signal, recording unit 314 then tunes to the new frequency.

In at least one embodiment, recording unit 314 commences storing broadcast programming in buffer 328 upon initial receipt of a notification signal indicating that mobile terminal 310 has been tuned to a particular frequency. Upon receipt of the notification signal, processor 322 of recording unit 314 tunes tuner 318 to the designated frequency, and the output of digitizer 320 is written into buffer 328 via CODEC 324. As with recording unit 10 (FIG. 2), a CODEC could be omitted and uncompressed audio stored. In one embodiment, buffer 328 only stores programming received within a recent time period (e.g., the last 30 minutes). If at the end of that time period no indication is received from mobile terminal 310 that a user would like to record broadcast programming, the output of CODEC 324 overwrites the oldest portion of the programming in buffer 328. If a user does wish to record programming to which he or she is listening on mobile terminal 310, the user may then cause mobile terminal 310 to send a record signal to recording unit 314 via wireless network 300. Upon receipt of the record signal, recording unit processor 322 may then mark the contents of buffer 328 for later storage in storage memory 330. If the length of the program which the user desires to record exceeds the buffer size (i.e., the time from the record signal to the stop record signal is such that one portion of the program to be recorded would overwrite a previously buffered portion), the output of CODEC 324 could be stored directly to storage memory 330. Alternately, the length of the buffer time period could be expanded.

By automatically buffering the digitizer output prior to receiving a record instruction, a user is able to "steal time," i.e., commence recording an entire program after the program has begun. For example, a user might tune mobile terminal 310 to a particular radio station and begin listening to a particular song. After the song begins, the user could then decide that he or she likes the song, and would like to record it for future enjoyment. The user then presses an appropriate key (or key combination) on mobile terminal keypad 344, which causes processor 352 to send a record signal to recording unit 324 over wireless network 300. Upon receipt of the record signal, and using the classifier 40 previously described, processor 322 identifies the start and/or stop points of a music track in the audio data within buffer 328, and copies the track to memory 330.

Figure 14A:
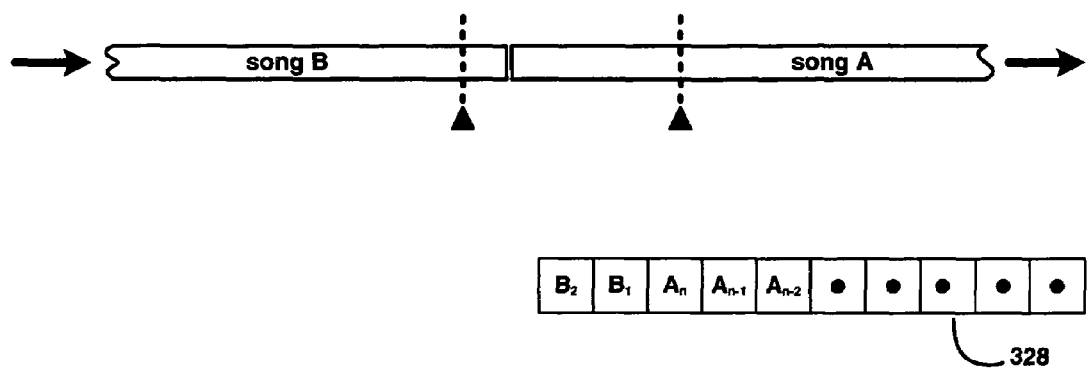
FIGS. 14A–14F are diagrams explaining recording of a music portion of a broadcast according to at least one embodiment of the invention.
Figure 14B:
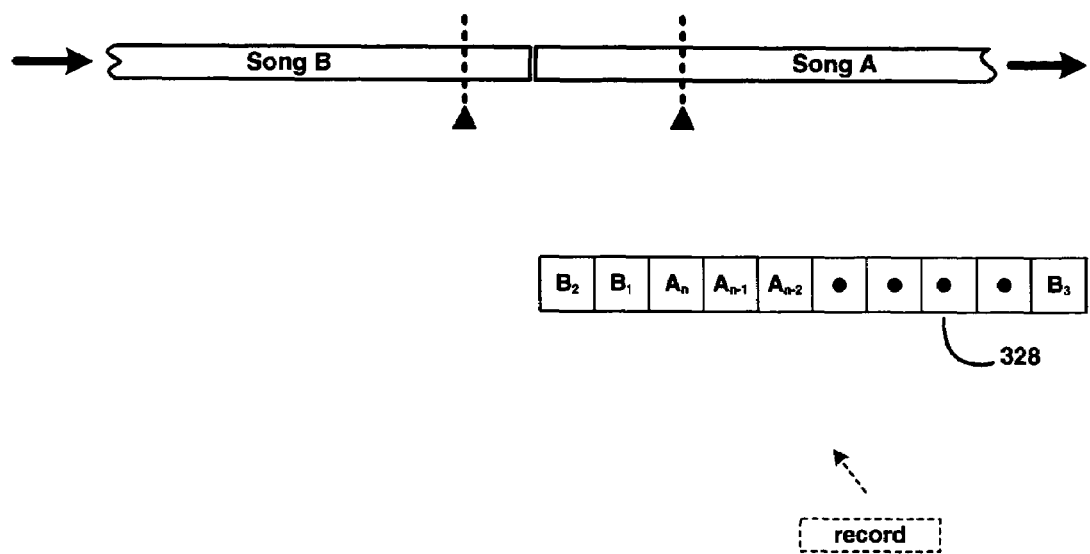
Figure 14C:
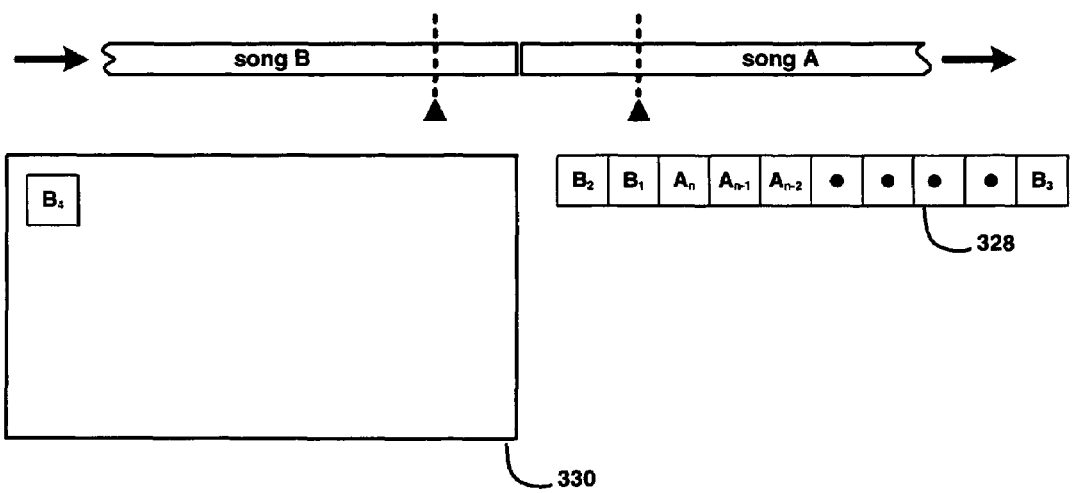
Figure 14D:
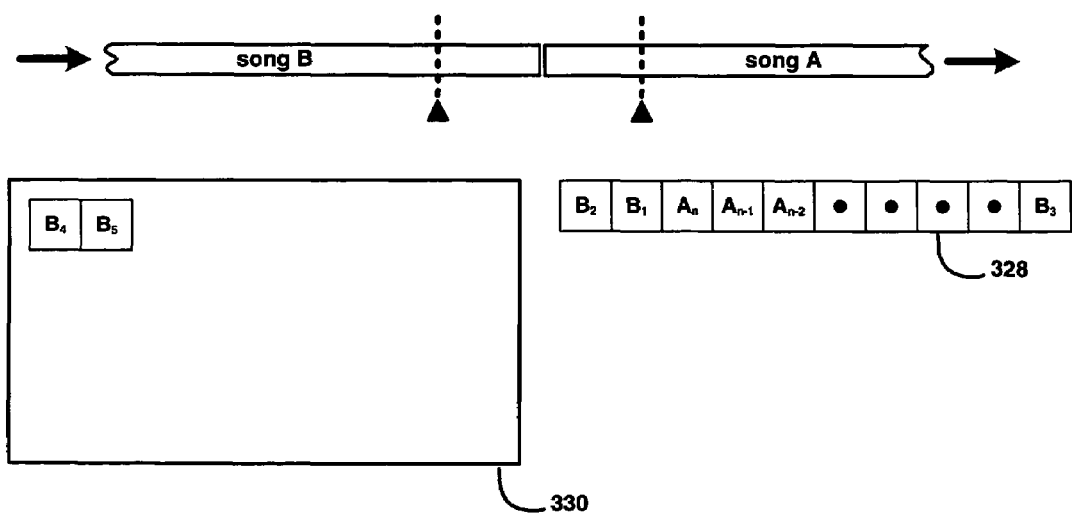
Figure 14E:
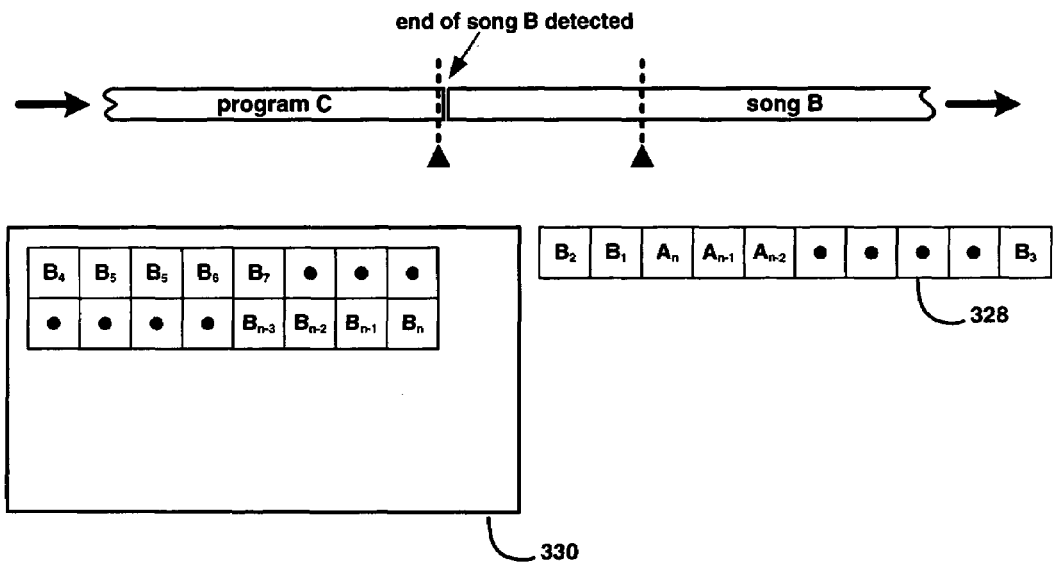
Figure 14F:
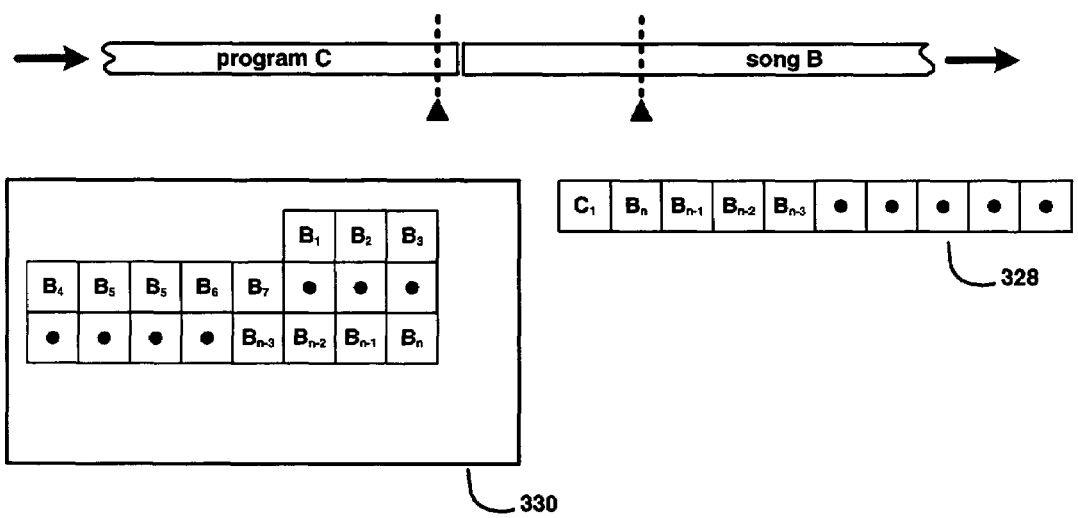

FIGS. 14A through 14F illustrate operation of at least one additional embodiment. In FIGS. 14A through 14F, two music programs being broadcast (identified as "song A" and "song B") are represented as variable length horizontal bars. As the song is played, the corresponding bar moves to the right. The current time is shown by the leftmost arrowhead and vertical dashed line. The portion of the song A or song B bar to the right of the first arrowhead represents portions of a program that have already been broadcast, while the portion of the bar to the left of the arrowhead represents portions of a program that have yet to be broadcast. The distance from the left arrowhead and vertical line to the rightmost arrowhead and vertical line represents the time period of the broadcast that is stored in buffer 328. The buffer contents are shown in diagrammatic form as $B_2$, $B_1$, $A_n$, $A_{n-1}$, etc. In particular, $B_1$ is the digitized first portion of song B and $B_2$ is the digitized second portion of song B. $A_n$ is the digitized last portion of song A, $A_{n-1}$ the digitized second-to-last portion of song A, etc. In FIG. 14A, song B has just begun. In FIG. 14B, recording unit 314 receives a record signal from mobile terminal 310. From that point in time forward, as shown in FIGS. 14C and 14D, digitized portions of song B are stored directly in storage memory 330. Processor 322 of recording unit 314 continuously analyzes the output of digitizer 320. Upon detecting the end of song B (FIG. 14E), processor 322 locates the beginning of song B in buffer 328, and then appends the buffered portion of song B to the portion already stored in storage memory 330 (FIG. 14F).

In one variation upon the operation shown by FIGS. 14A through 14F, processor 322 could immediately locate the beginning of song B in buffer 328 and transfer the buffered portion of song B to storage memory 330 prior to completion of the broadcast of song B. In another variation, processor 14 assumes upon receipt of a record signal that a song is in progress, and looks for the next transition from <SF> below $<SF>_{MAX}$ to <SF> above $<SF>_{MAX}$. Once that transition occurs, the beginning of the song is found in the previously buffered portion, and the entire song moved to memory 330 at that point. The algorithms of FIGS. 8A through 10B can also be modified to detect beginnings and ends of songs that are already in progress. Instead of searching for a transition for <SF> above $<SF>_{MAX}$ to <SF> below $<SF>_{MAX}$ (steps 202, 220, 240), receipt of a record signal causes processor 14 to look backward through previously buffered portions of a song for a transition for <SF> below $<SF>_{MAX}$ to <SF> above $<SF>_{MAX}$. Processor 14 then looks forward from the point that the record signal was received for a transition for <SF> below $<SF>_{MAX}$ to <SF> above $<SF>_{MAX}$. In another variation, the recording unit can automatically determine the starting point of the song, but be advised of the ending point by a subsequent signal from the user. So as to avoid loss of a program portion while buffer contents are being analyzed or transferred, recording unit 314 could be implemented with parallel processors and/or buffers so that portions of a broadcast could be analyzed or buffered while other portions are transferred to (or originally placed in) storage memory 330.

In still other embodiments, classifier 40 executes in the background and continuously identifies start and stop points for music tracks as they are broadcast. When a user initiates a "record" command (via mobile terminal 310, by manually inputting a record command into recording unit 10, or otherwise), the processor simply stores the music track having start and stop points with timestamps bounding the timestamp of the record command. In the event the user initiates a record command when the smoothed spectral flux for a current frame may not be recognized as music (e.g., a portion of a song in which speech predominates), or during a track of less than minimum duration, additional steps could be implemented. In one variation, the processor is configured to record a minimum track size and/or a minimum amount of audio preceding and following the record command. In another variation, the processor treats the time of the record command as being within a music track, and then searches for the beginning and end of the track as previously described (based on the relation of smoothed spectral flux to a threshold). In effect, a peak in smoothed spectral flux at the time of the record command is ignored.

Although specific examples of carrying out the invention have been described, those skilled in the art will appreciate that there are numerous variations and permutations of the above-described systems and methods that are contained within the spirit and scope of the invention as set forth in the appended claims. For example, a recording unit and/or mobile terminal could be configured so that a user could choose between manual and automatic recording modes. The various buffer sizes, time periods and other operating parameters described above could be configurable by a user. As yet a further alternative, a machine-readable medium could have machine-executable instructions stored thereon such that, when the instructions are read and executed by an appropriate device (or devices), steps of a method according to the invention are performed. These and other modifications are within the scope of the invention as defined in the attached claims.

We claim:

1. A method for selectively recording music portions of an audio stream, comprising:

receiving an audio stream having music and non-music portions;

segmenting the audio stream into successive frames;

passing each of a plurality of the frames through a filter bank, the filter bank including filters with bandwidths approximately proportional to their center frequencies;

computing a modified spectral flux value for at least a subset of the plurality of frames;

identifying a start frame, the start frame being a frame of the plurality having a modified spectral flux value below a threshold value;

identifying a stop frame, the stop frame being a frame of the plurality having a modified spectral flux value above the threshold value; and recording a portion of the audio stream bounded by the start and stop frames.

2. The method of claim 1, wherein said passing each of the plurality of frames through a filter bank comprises passing each of the plurality of frames through five Infinite Impulse Response (IIR) filters.

3. The method of claim 2, wherein the five IIR filters comprise a low pass filter, a band pass filter centered at approximately 450 Hz, a band pass filter centered at approximately 900 Hz, a band pass filter centered at approximately 1500 Hz, and a high pass filter.

4. The method of claim 1, further comprising:
determining whether time elapsed between the start frame and the stop frame exceeds a minimum duration, and wherein:
said recording step is performed upon determining that the elapsed time exceeds the minimum duration.

5. The method of claim 1, further comprising:
determining whether a time elapsed since the start frame exceeds a spectral flux threshold reset time; and
resetting the spectral flux threshold value upon determining the elapsed time exceeds the reset time, wherein:
said identifying a stop frame comprises identifying a frame of the plurality having a modified spectral flux value above the reset spectral flux threshold value.

6. The method of claim 1, further comprising:
determining whether a time elapsed since the start frame exceeds a maximum duration, and wherein:
said identifying a stop frame and said recording steps are performed based on the elapsed time not exceeding the maximum duration.

7. The method of claim 1, further comprising receiving a recording control signal initiated from a remotely located mobile terminal, and wherein:
said identifying a start frame comprises locating the start frame in a buffered portion of the audio stream, and
said recording comprises copying the portion of the audio stream received since the start frame into another memory.

8. The method of claim 1, further comprising:
digitizing the audio stream, and wherein:
said segmenting step comprises segmenting the digitized audio stream into successive digitized frames,
said passing step comprises passing each of a plurality of digitized frames through multiple filters, and
said computing step comprises computing a modified spectral flux value for at least a subset of the plurality of digitized frames.

9. The method of claim 1, wherein a modified spectral flux comprises a value of spectral flux averaged over K previous frames, where K is an integer.

10. A method for selectively recording music portions of a radio broadcast, comprising:
receiving a radio broadcast consisting essentially of an audio transmission, the audio transmission comprising a plurality of frames;

passing each of the plurality of frames through a filter bank, the filter bank including filters with bandwidths approximately proportional to their center freguencies;

calculating a modified spectral flux value for at least a subset of the plurality of frames of the audio transmission using the filtered frames;

identifying a start point, the start point being a frame in the audio transmission having a modified spectral flux value bearing a first relation to a threshold value;

identifying a stop point, the stop point being a frame in the audio transmission having a modified spectral flux value bearing a second relation to the threshold value;

recording a portion of the audio transmission bounded by the start and stop points.

11. The method of claim 10, further comprising receiving a recording control signal initiated from a remotely located mobile terminal, and wherein:
said identifying a start point comprises locating, within a buffered portion of the audio transmission, a frame having a modified spectral flux value bearing the first relation to the threshold value, and
said recording comprises copying the portion of the audio transmission received since the start point into another memory.

12. A machine-readable medium having machine-executable instructions for performing steps comprising:
receiving an audio stream having music and non-music portions;
segmenting the audio stream into successive frames;
passing each of a plurality of the frames through a filter bank, the filter bank including filters with bandwidths approximately proportional to their center frequencies;
computing a modified spectral flux value for at least a subset of the plurality of frames;
identifying a start frame, the start frame being a frame of the plurality having a modified spectral flux value below a threshold value;
identifying a stop frame, the stop frame being a frame of the plurality having a modified spectral flux value above the threshold value; and
recording a portion of the audio stream bounded by the start and stop frames.

13. The machine-readable medium of claim 12, wherein said passing each of the plurality of frames through a filter bank comprises passing each of the plurality of frames through five Infinite Impulse Response (IIR) filters.

14. The machine-readable medium of claim 13, wherein the five IIR filters comprise a low pass filter, a band pass filter centered at approximately 450 Hz, a band pass filter centered at approximately 900 Hz, a band pass filter centered at approximately 1500 Hz, and a high pass filter.

15. The machine-readable medium of claim 12, comprising further instructions for performing steps comprising:
determining whether time elapsed between the start frame and the stop frame exceeds a minimum duration, and wherein:
said recording step is performed upon determining that the elapsed time exceeds the minimum duration.

16. The machine-readable medium of claim 12, comprising further instructions for performing steps comprising:
determining whether a time elapsed since the start frame exceeds a spectral flux threshold reset time; and
resetting the spectral flux threshold value upon determining the elapsed time exceeds the reset time, wherein:
said identifying a stop frame comprises identifying a frame of the plurality having a modified spectral flux value above the reset spectral flux threshold value.

17. The machine-readable medium of claim 12, comprising further instructions for performing steps comprising:
determining whether a time elapsed since the start frame exceeds a maximum duration, and wherein:
said identifying a stop frame and said recording steps are performed based on the elapsed time not exceeding the maximum duration.

18. The machine-readable medium of claim 12, comprising further instructions for performing steps comprising receiving a recording control signal initiated from a remotely located mobile terminal, and wherein:
said identifying a start frame comprises locating the start frame in a buffered portion of the audio stream, and
said recording comprises copying the portion of the audio stream received since the start frame into another memory.

19. The machine-readable medium of claim 12, wherein a modified spectral flux comprises a value of spectral flux averaged over K previous frames, where K is an integer.

20. A machine-readable medium having machine-executable instructions for performing steps comprising:
receiving a radio broadcast consisting essentially of an audio transmission, the audio transmission comprising a plurality of frames;
passing each of the plurality of frames through a filter bank, the filter bank including filters with bandwidths approximately proportional to their center frequencies;
calculating a modified spectral flux value for at least a subset of the plurality of frames of the audio transmission using the filtered frames;
identifying a start point, the start point being a frame in the audio transmission having a modified spectral flux value bearing a first relation to a threshold value;
identifying a stop point, the stop point being a frame in the audio transmission having a modified spectral flux value bearing a second relation to the threshold value; and
recording a portion of the audio transmission bounded by the start and stop points.

21. The machine-readable medium of claim 20, comprising further instructions for performing steps comprising receiving a recording control signal initiated from a remotely located mobile terminal, and wherein:
said identifying a start point comprises locating, within a buffered portion of the audio transmission, a frame having a modified spectral flux value bearing the first relation to the threshold value, and
said recording comprises copying the portion of the audio transmission received since the start point into another memory.

22. A recording unit for recording broadcast programming, comprising:
a receiver for tuning to broadcast radio frequencies and receiving broadcast programming;
a memory having instructions stored therein; and
a processor coupled to the receiver and to the memory and configured to execute the instructions so as to:
receive an audio stream having music and non-music portions,
segment the audio stream into successive frames,
pass each of a plurality of the frames through a filter bank, the filter bank including filters with bandwidths approximately proportional to their center frequencies,
compute a modified spectral flux value for at least a subset of the plurality of frames,
identify a start frame, the start frame being a frame of the plurality having a modified spectral flux value below a threshold value,
identify a stop frame, the stop frame being a frame of the plurality having a modified spectral flux value above the threshold value, and
record a portion of the audio stream bounded by the start and stop frames.

23. The recording unit of claim 22, wherein said passing each of the plurality of frames through a filter bank comprises passing each of the plurality of frames through five Infinite Impulse Response (IIR) filters.

24. The recording unit of claim 23, wherein the five IIR filters comprise a low pass filter, a band pass filter centered at approximately 450 Hz, a band pass filter centered at approximately 900 Hz, a band pass filter centered at approximately 1500 Hz, and a high pass filter.

25. The recording unit of claim 22, wherein the processor is further configured to execute the instructions so as to:
determine whether time elapsed between the start frame and the stop frame exceeds a minimum duration, and wherein:
said recording step is performed upon determining that the elapsed time exceeds the minimum duration.

26. The recording unit of claim 22, wherein the processor is further configured to execute the instructions so as to:
determine whether time elapsed since the start frame exceeds a spectral flux threshold reset time, and
reset the spectral flux threshold value upon determining the elapsed time exceeds the reset time, and wherein:
said identifying a stop frame comprises identifying a frame of the plurality having a modified spectral flux value above the reset spectral flux threshold value.

27. The recording unit of claim 22, wherein the processor is further configured to execute the instructions so as to:
determine whether time elapsed since the start frame exceeds a maximum duration, and wherein:
said identifying a stop frame and said recording steps are performed based on the elapsed time not exceeding the maximum duration.

28. The recording unit of claim 22, wherein the recording unit is a remote recording unit, wherein the processor is further configured to execute the instructions so as to receive a recording control signal initiated from a remotely located mobile terminal, and wherein:
said identifying a start frame comprises locating the start frame in a buffered portion of the audio stream, and
said recording comprises copying the portion of the audio stream received since the start frame into another memory.

29. A recording unit for remotely recording broadcast programming, comprising:
a receiver for tuning to broadcast radio frequencies and receiving broadcast programming;
a memory having instructions stored therein; and
a processor coupled to the receiver and to the memory and configured to execute the instructions so as to:
receive a radio broadcast consisting essentially of an audio transmission, the audio transmission comprising a plurality of frames,
pass each of the plurality of frames through a filter bank, the filter bank including filters with bandwidths approximately proportional to their center frequencies,
calculate a modified spectral flux value for at least a subset of the plurality of frames of the audio transmission using the filtered frames, identify a start point in the audio transmission, the start point being a frame in the audio transmission having a modified spectral flux value bearing a first relation to a threshold value, identify a stop point in the audio transmission, the stop point being a frame in the audio transmission having a modified spectral flux value bearing a second relation to the threshold value, and record a portion of the audio transmission bounded by the start and stop points.

30. The recording unit of claim 29, wherein the recording unit is a remote recording unit, wherein the processor is further configured to execute the instructions so as to receive a recording control signal initiated from a remotely located mobile terminal, and wherein:

said identifying a start point comprises locating, within a buffered portion of the audio transmission, a start point having a modified spectral flux value bearing the first relation to the threshold value, and said recording comprises copying the portion of the audio transmission received since the start point into another memory.

31. A recording unit for remotely recording broadcast programming, comprising:

a receiver for tuning to broadcast radio frequencies and receiving broadcast programming;

a buffer memory;

a storage memory having instructions stored therein;

a network interface; and a processor coupled to the receiver, to the network interface and to the memories and configured to execute the instructions so as to:

receive an audio stream having music and non-music portions, segment the audio stream into successive frames, pass each of a plurality of the frames through a low pass Infinite Impulse Response (IIR) filter, a band pass IIR filter centered at approximately 450 Hz, a band pass IIR filter centered at approximately 900 Hz, a band pass IIR filter centered at approximately 1500 Hz, and a high pass IIR filter, compute a modified spectral flux value for each of the plurality of frames based on the output of the filters, receive, via the network interface, a recording control signal initiated from a remotely located mobile terminal, upon receipt of the recording control signal, identify a start frame in a portion of the audio stream stored in the buffer memory, the start frame being a frame of the plurality having a modified spectral flux value below a threshold value, identify a stop frame, the stop frame being a frame of the plurality having a modified spectral flux value above the threshold value, upon determining that the time elapsed between the start and stop frames exceeds a minimum value, store in the storage memory the part of the audio stream bounded by the start and stop frames, said storing including copying from the buffer memory a part of the audio stream buffered after the start frame.

* * * * *

UNITED STATES PATENT AND TRADEMARK OFFICE
CERTIFICATE OF CORRECTION

PATENT NO. : 7,179,980 B2
APPLICATION NO. : 10/733257
DATED : February 20, 2007
INVENTOR(S) : Ole Kirkeby et al.

It is certified that error appears in the above-identified patent and that said Letters Patent is hereby corrected as shown below:

In Column 14, Claim 10, Line 3:
    Please replace "freguencies" with --frequencies--.

In Column 14, Claim 10, Line 12:
    Please replace "threshold value;" with --threshold value; and--.

Signed and Sealed this

Seventh Day of August, 2007

JON W. DUDAS
*Director of the United States Patent and Trademark Office*